United States Patent
Kiuchi et al.

(10) Patent No.: US 8,049,764 B2
(45) Date of Patent: Nov. 1, 2011

(54) VIDEO SIGNAL PROCESSING DEVICE, VIDEO SIGNAL PROCESSING METHOD, VIDEO SIGNAL PROCESSING PROGRAM, INTEGRATED CIRCUIT, AND VIDEO SIGNAL DISPLAY DEVICE

(75) Inventors: Shinya Kiuchi, Osaka (JP); Tsuyoshi Hirashima, Osaka (JP); Bumpei Toji, Gifu (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 12/017,556

(22) Filed: Jan. 22, 2008

(65) Prior Publication Data

US 2008/0174605 A1 Jul. 24, 2008

(30) Foreign Application Priority Data

Jan. 23, 2007 (JP) .................................. 2007-012214

(51) Int. Cl.
*G09G 5/39* (2006.01)
(52) U.S. Cl. ........................................ 345/589; 345/690
(58) Field of Classification Search .................. 345/589, 345/690
See application file for complete search history.

(56) References Cited

U.S. PATENT DOCUMENTS

| 6,791,566 | B1 | 9/2004 | Kuratomi et al. | |
| 7,613,338 | B2 * | 11/2009 | Yano | 382/162 |
| 2005/0207642 | A1 * | 9/2005 | Yano | 382/162 |
| 2006/0177110 | A1 | 8/2006 | Imagawa et al. | |
| 2007/0035565 | A1 * | 2/2007 | Kerofsky | 345/690 |

FOREIGN PATENT DOCUMENTS

| JP | 6-282241 | 10/1994 |
| JP | 2002-55675 | 2/2002 |
| JP | 2002-72951 | 3/2002 |
| JP | 2002-116728 | 4/2002 |
| JP | 2006-228199 | 8/2006 |

* cited by examiner

*Primary Examiner* — Richard Hjerpe
*Assistant Examiner* — Jeffrey Steinberg
(74) *Attorney, Agent, or Firm* — Wenderoth, Lind & Ponack, L.L.P.

(57) ABSTRACT

On the display screen of a video signal display device, when the emission amount is monotonically lowered toward the screen periphery from a certain point (screen center), if there are a plurality of regions that viewers notice easily (such as faces), then correction by monotically decreasing the emission amount cannot always raise the signal level in the regions that are noticed, and it may not be possible to obtain a sufficient sense of brightness. In the video signal processing device, a multiple object detection portion detects a plurality of objects that are included in a unit image, and a correction gain is calculated such that when the unit image is displayed on the display device, a point on the display screen at which an emission amount that is lower than the emission amount on the display screen at a point that is substantially in the center between any two objects is in a region between the points substantially in the center of the two objects, and the input video signal is corrected with that correction gain. Thus, it is possible to maintain a sense of brightness about a plurality of objects on the display screen that are readily noticed by viewers, while suppressing power usage by the display device that displays the video signal.

22 Claims, 16 Drawing Sheets correction gain for
signal level adjustment
(1−(correction gain))

screen position

VIDEO SIGNAL PROCESSING DEVICE, VIDEO SIGNAL PROCESSING METHOD, VIDEO SIGNAL PROCESSING PROGRAM, INTEGRATED CIRCUIT, AND VIDEO SIGNAL DISPLAY DEVICE

BACKGROUND OF THE INVENTION

1. Field of the Invention

The present invention relates to self-emitting type video signal processing devices that emit light themselves and that have a display screen that permits light adjustment.

2. Description of the Related Art

Recently there has been a demand for high-quality display devices, and one important element of such display devices is the brightness of their display screen. However, simply increasing the brightness of the display screen that is displayed on the display device requires a large consumption of power.

On the other hand, there is increased concern for the environment in recent years, and this has made it important to reduce power use.

It would be desirable to achieve a display device that can balance these opposing goals of increasing the brightness of the display screen and reducing power use.

To suppress power use, many self-emitting display devices have a control to restrict the power use when the video signal has a high average picture level (hereinafter, APL). When this control is active, control is performed such that the total light that is emitted by the display screen of the self-emitting display device is constant.

Accordingly, one technology for self-emitting display devices involves lowering the emission amount in parts of the display screen that viewers are relatively less likely to notice and increasing the emission amount at the display screen center, which viewers are more likely to focus on, by this amount that the emission has been lowered, so as to increase the overall sense of brightness of the display screen while keep a constant power consumption (for example, see JP H6-282241A, JP 2002-116728A and JP 2006-228199A).

FIG. 16 shows the configuration of a video signal display device 1600, which serves as an example of the conventional technology.

The video signal display device 1600 is made from a video signal processing device 1601 for performing predetermined processing on a video signal, and a display device 1602 that displays the video signal that has been processed by the video signal processing device 1601.

The video signal processing device 1601 is constituted by a mean luminance detection portion 1603 for detecting the APL of the video signal that is input, a gain creation portion 1604 for creating a gain for signal level adjustment based on the APL that has been detected, and a signal level adjustment portion 1605 for adjusting the signal level of the video signal that has been input based on the gain for signal level adjustment that has been created and outputting it to the display device 1602.

The operation of the video signal display device 1600 is described next using FIG. 16.

This explanation is made with regard to an example in which a video signal that forms an image such as that shown in FIG. 16B has been input to the video signal display device 1600, and the video signal forms the line between P and Q that is shown in FIG. 16B.

In this case, the signal level of the video signal that has been input is adjusted with the signal level adjustment gain based on the APL that has been detected by the mean luminance detection portion 1603, and the result is output to the display device 1602. Specifically, a signal level adjustment gain such as that shown in FIG. 16C is created for the video signal between P and Q, and the signal level of the video signal is adjusted by multiplying this signal level adjustment gain and the video signal between P and Q that has been input.

Thus, the signal level of the video signal that is output to the display device 1602 is higher near its center than at its periphery, and thus the display screen that is displayed on the display device 1602 is bright near the center between P and Q and becomes progressively less bright toward its periphery. Consequently, the video signal display device 1600 allows power usage to be lowered while preventing a drop in the display quality of the display screen.

With conventional video signal display devices, however, there is the problem that, because the emission amount is monotonically lowered from a certain point (for example, the display screen center) on the display screen of the video being displayed toward its periphery, if the display screen includes a plurality of regions that viewers readily focus on (such as faces), then correction by monotically decreasing the emission amount from the center of the display screen toward its periphery cannot always raise the emission amount in regions that are noticed, and it may not be possible to obtain a sufficiently bright feeling on the display screen.

The present invention was arrived at in light of these issues, and it is an object thereof to achieve a video signal display device, a video signal processing device, a video signal processing method, an integrated circuit, and a video signal processing program that can obtain a sufficient sense of brightness on the display screen, even if the display screen includes a plurality of regions that viewers a likely to focus on, and that also can suppress power usage.

SUMMARY OF THE INVENTION

A first aspect of the invention is a video signal processing device for creating a display video signal to be displayed on a light-adjustable display device, furnished with a multiple object detection portion, a correction gain calculation portion, and a signal level correction portion. The multiple object detection portion detects a plurality of objects that are included in a unit image that is formed by an input video signal. The correction gain calculation portion calculates a correction gain such that when the unit image is displayed on the display device, a point on a display screen at which an emission amount that is lower than the emission amount on the display screen at a point that is substantially in the center between any two objects is in a region between the points substantially in the center of the two objects. The signal level correction portion corrects the input video signal in accordance with the correction gain and outputs the result to the display device as the display video signal.

With this video signal processing device, a correction gain is calculated such that, on the display screen in a case where a plurality of objects that are included in a unit image are detected by the multiple object detection portion, and that unit image is displayed by the display device, the point at which the emission amount is lower than the emission amount on the display screen at the point that is substantially in the center between any two objects is in a region between the points substantially in the center of the two objects, and the input video signal is corrected with that correction gain. Thus, the emission amount is increased centering on the plurality of objects on the display screen that are easily noticed by viewers, and the emission amount of the area around the objects is lowered. Thus, it is possible to maintain the sense of brightness about the objects on the display screen that are readily noticed by viewers, while keeping down power use by the display device that displays the video signal.

It should be noted that here "unit image" is used to refer to a single image that can be displayed by the display device, and for example corresponds to a single image that is formed by the video signal of a single frame in an interlaced television signal (a single image that is displayed as a single display screen on the display device) or a single image that is formed by the video signal of a single field in a non-interlaced television signal.

A second aspect of the invention is the invention of the first aspect, in which the correction gain calculation portion includes a same number of slope gain creation portions, which calculate a slope gain for each object that has been calculated by the multiple object detection portion, as a maximum number of detectable objects, and a slope gain joining portion that joins the slope gain of each object to create a single correction gain.

With this video signal processing device, the slope gain creation portions can calculate the slope gain of as many detected objects, and by joining the slope gain of as many detected objects with the slope gain joining portion it is possible to calculate a single correction gain.

A third aspect of the invention is the invention of the second aspect, in which the slope gain creation portions are corresponded with the order of detection of the objects that are detected by the multiple object detection portion.

Thus, it is possible to assign the slope gain correction portions in the order of the detected objects. In other words, if N equals the number of objects that are detected, then the first slope gain creation portion is assigned to calculate the slope gain for the object that is detected first, the second slope gain creation portion is assigned to calculate the slope gain for the object that is detected second, and so forth, until the N-th slope gain creation portion is assigned to calculate the slope gain for the N-th detected object.

It should be noted that "correlated with" means that a slope gain creation portion is assigned for the detected object.

A fourth aspect of the invention is the invention of the second aspect, in which the slope gain creation portions are corresponded in order with the size of the objects that are detected by the multiple object detection portion.

A fifth aspect of the invention is the invention according to any one of the second through fourth aspects, in which the maximum number of detectable objects is a number that is set in advance.

Thus, the processing efficiency of the video signal processing device can be increased because it is possible to set an upper limit to the number of detectable objects. Further, if hardware is used to realize this video signal processing device, then it is possible to reduce the scale of the circuit that is installed.

A sixth aspect of the invention is the invention according to any one of the second through fifth aspects, in which the slope gain joining portion takes the smallest slope gain of each object as the correction gain, and in which the signal level correction portion corrects the input video signal by a factor of (1−(the correction gain)).

With this video signal processing device, the slope gain joining portion regards the smallest slope gain of the objects as the correction gain, and the input video signal is corrected by a factor of (1−(the correction gain)) by the signal level correction portion. Thus, the slope gain does not significantly change even if numerous objects overlap on the display screen, and it is possible to inhibit flickering, for example, on the display screen.

A seventh aspect of the invention is the invention according to any one of the second through sixth aspects, in which each slope gain creation portion has a distance calculation portion operable to calculate, for each pixel making up the unit image, a distance between the object and the pixel, and a gain calculation portion operable to calculate the slope gain in accordance with the distance that has been calculated by the distance calculate portion.

Thus, it is possible to calculate a slope gain that is in accord with the distance between the pixels and the object.

An eighth aspect of the invention is the invention of the seventh aspect, in which the gain calculation portions calculate the slope gain such that the slope gain increases the greater the distance from the substantial center point of the object.

With this video signal processing device, the slope gain is changed such that it increases as the distance from the substantial center point of the object increases, and thus it is possible to maintain a natural sense of brightness on the display screen while suppressing the power that is consumed when the video signal that is output from the video signal processing device is displayed on the display device.

A ninth aspect of the invention is the invention of the eighth aspect, in which the gain calculation portions calculate the slope gain through a Gaussian function.

With this video signal processing device, the slope gain is changed gently using a Gaussian function such that it increases as the distance from the substantial center point of the object increases, and thus it is possible to maintain a natural sense of brightness on the display screen while suppressing the power that is consumed when the video signal that is output from the video signal processing device is displayed on the display device.

A tenth aspect of the invention is the invention according to any one of the second through ninth aspects, in which each slope gain creation portion further includes an object distance calculation portion that is corresponded to the object that has been detected by the multiple object detection portion, and that is operable to calculate a total object distance that is a sum of the distance between the corresponded object and the objects other than the corresponded object, and in which the gain calculation portions calculate the slope gain based on the total object distance.

With this video signal processing device, the object distance calculation portion that calculates a total object distance that is a sum of the distance between an object that is corresponded with that object distance calculation portion and the objects other than the object that is corresponded with that object distance calculation portion, and the slope gain is calculated by the gain calculation portions based on the total object distance. Thus, it is possible to change the correction gain depending on whether a plurality of objects are concentrated together or whether they are dispersed on the display screen. Then, by making sections in which objects are concentrated, which are readily noticed by viewers, brighter on the display screen, it is possible to increase the sense of brightness.

An eleventh aspect of the invention is the invention according to any one of the second through tenth aspects, in which the slope gain creation portions calculate the slope gain in accordance with a property of the object.

A twelfth aspect of the invention is the invention of the eleventh aspect, in which the property of the object is at least one of the number of detected objects, the size of the object, and the distance from the center of the display screen to the substantially center point of the object.

Thus, if for example a large object is present on the display screen, the slope gain can be set so as to gently lower the luminance on the display screen from the center of the object toward its periphery. It is therefore possible to increase the sense of brightness around a large object, which is easily recognized by the viewer.

A 13th aspect of the invention is the invention according to any one of the second through twelfth aspects, further including a default slope gain creation portion, which includes a central distance calculation portion that is operable to calculate, for each pixel making up the unit image, the distance between the pixel and the display screen center, and a gain calculation portion that is operable to calculate the slope gain in accordance with the distance that is calculated by the central distance calculation portion. The slope gain joining portion, in a case where not even one object has been detected by the multiple object detection portion, regards the slope gain that has been calculated by the default slope gain creation portion as the correction gain, and in a case where an object has been detected by the multiple object detection portion, joins the slope gain that has been detected by the default slope gain creation portion and the slope gain that has been detected by the slope gain creation portion to create a single correction gain.

It is therefore possible to maintain a sense of brightness while keeping down power consumption by the display device that displays the video signal, even if there is not even a single object on the display screen.

A 14th aspect of the invention is the invention of the 13th aspect, in which the slope gain joining portion regards the slope gain that has been calculated by the default slope gain creation portion as the correction gain in a case where the number of objects detected by the multiple object detection portion is equal to or greater than a fixed value.

Thus, for example, if many objects are detected, then it is possible to correct the signal level using the slope gain that has been calculated by the default slope gain creation portion as the correction gain.

A 15th aspect of the invention is the invention according to any one of the second through 14th aspects, further including a characteristic amount extraction portion that is operable to extract a characteristic amount in the unit image. The gain calculation portion calculates the slope gain in accordance with the characteristic amount.

Thus, it is possible to adjust the signal level of the input video signal with a slope gain that is in correspondence with a characteristic of the unit image. For example, it is possible to adjust the signal level of the input video signal with a slope gain that is in correspondence with a characteristic of the unit image for each field or each frame, and thus, in particular this is effective for the case of processing video, which is a moving image. It should be noted that here, the characteristic amount is, for example, a predetermined frequency component power, mean luminance, mean saturation, or histogram distribution, etc., in the unit image.

A 16th aspect of the invention a video signal display device that includes a video signal processing device according to the invention according to any one of the first through 15th aspects, and a display device that displays a video signal that is output from the video signal processing device.

A 17th aspect of the invention is the invention of the 16th aspect, in which the display device is a self-emitting type display device that has a power limit portion that is operable to limit the power consumed by the display device when an average picture level of the video signal is equal to or greater than a predetermined value.

An 18th aspect of the invention is a video signal processing method of creating a display video signal to be displayed on a light-adjustable display device, in which the method includes a multiple object detection step, a correction gain calculation step, and a signal level correction step. The multiple object detection step involves detecting a plurality of objects that are included in a unit image that is formed by an input video signal. The correction gain calculation step involves calculating a correction gain such that when the unit image is displayed on the display device, a point on a display screen at which an emission amount that is lower than the emission amount on the display screen at a point that is substantially in the center between any two objects is in a region between the points substantially in the center of the two objects. The signal level correction step involves correcting the input video signal in accordance with the correction gain and outputs the result to the display device as the display video signal.

This video signal processing method attains the same effects as the invention of the first aspect.

A 19th aspect of the invention is a computer-readable storage medium on which is stored a video signal processing program for creating a display video signal to be displayed on a light-adjustable display device, in which the program causes a computer to function as a multiple object detection portion, a correction gain calculation portion, and a signal level correction portion. The multiple object detection portion detects a plurality of objects that are included in a unit image that is formed by an input video signal. The correction gain calculation portion calculates a correction gain such that when the unit image is displayed on the display device, a point on a display screen at which an emission amount that is lower than the emission amount on the display screen at a point that is substantially in the center between any two objects is in a region between the points substantially in the center of the two objects. The signal level correction portion corrects the input video signal in accordance with the correction gain and outputs the result to the display device as the display video signal.

This computer-readable storage medium on which is stored the video signal processing program attains the same effects as the invention of the first aspect.

A 20th aspect of the invention is an integrated circuit for creating a display video signal to be displayed on a light-adjustable display device, which includes a multiple object detection portion, a correction gain calculation portion, and a signal level correction portion. The multiple object detection portion detects a plurality of objects that are included in a unit image that is formed by an input video signal. The correction gain calculation portion calculates a correction gain such that when the unit image is displayed on the display device, a point on a display screen at which an emission amount that is lower than the emission amount on the display screen at a point that is substantially in the center between any two objects is in a region between the points substantially in the center of the two objects. The signal level correction portion corrects the input video signal in accordance with the correction gain and outputs the result to the display device as the display video signal.

This integrated circuit attains the same effects as the invention of the first aspect.

With this invention, it is possible to achieve a video signal display device, a video signal processing device, a video signal processing method, an integrated circuit, and a video signal processing program, that obtain a sufficient sense of brightness on the display screen, and that can suppress power

DETAILED DESCRIPTION OF THE INVENTION.

Below, embodiments of the invention are described with reference to the drawings.

First Embodiment

<1.1: Configuration of the Video Signal Display Device>

Figure 1:
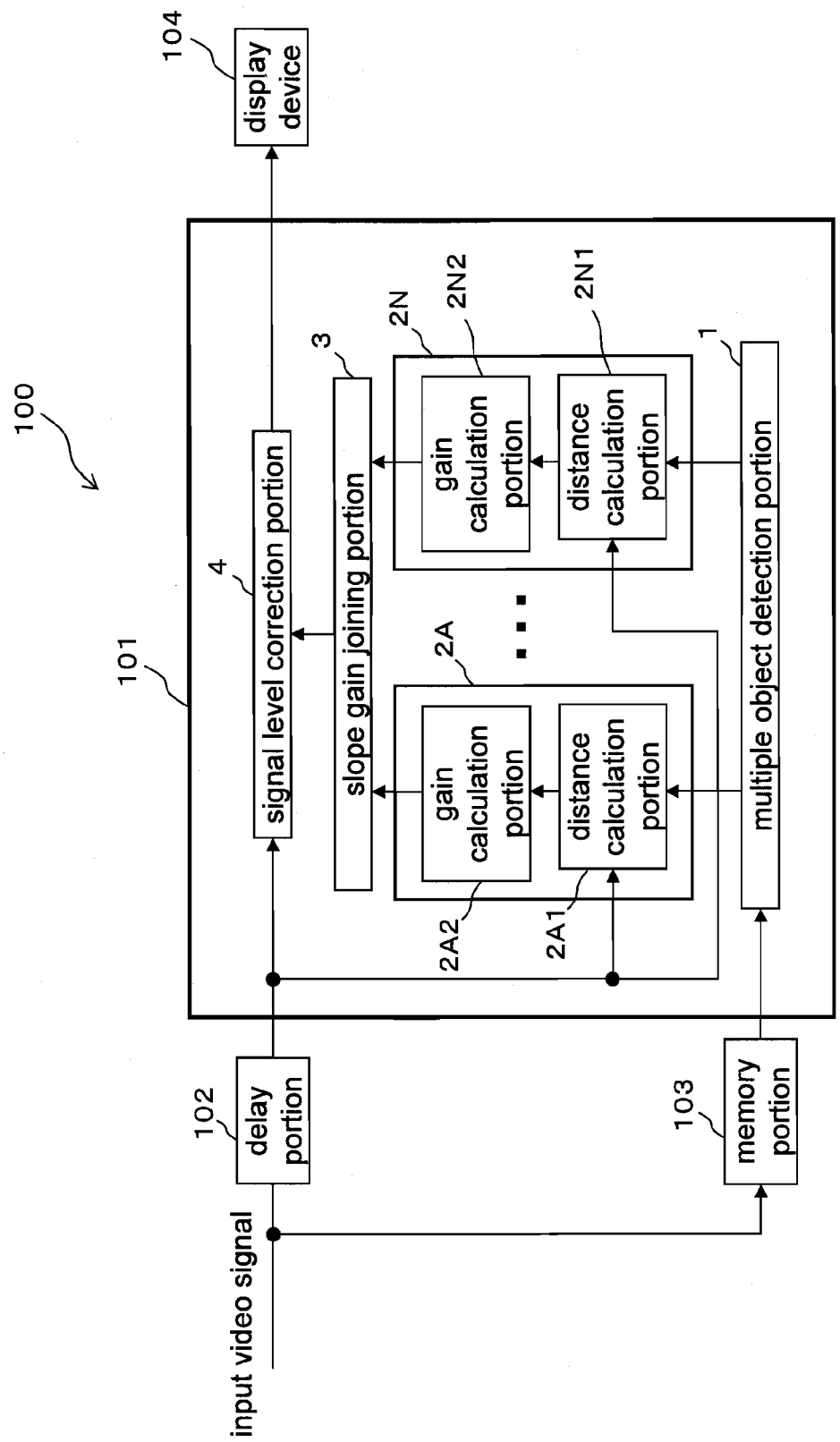
FIG. 1 shows the configuration of the video signal display device according to a first embodiment of the invention.

FIG. 1 shows the configuration of a video signal display device 100 according to the first embodiment.

The video signal display device 100 according to the first embodiment is primarily made of a video signal processing device 101, a display device 104, a delay portion 102, and a memory portion 103.

The video signal processing device 101 performs predetermined processing on an input video signal and outputs the result to the display device 104. The display device 104 displays the video that is formed by the video signal that has been processed by the video signal processing device 101 on its display portion (not shown).

The memory portion 103 stores and holds the input video signal of a unit image (for example, one frame image) that is formed by the video signal as video signal data. It is possible to externally access the video signal data of the input video signal that is stored and held by the memory portion 103. As the memory portion 103, it is possible to use a frame memory, for example.

The delay portion 102 delays the input video signal by a predetermined time.

The video signal processing device 101 is primarily made of a multiple object detection portion 1 that detects a plurality of objects that are contained in the input video signal, N-number (where N is a natural number of 2 or more) of slope gain creation portions 2A to 2N that create N-number of slope gains, each of which corresponds to an object, from the information on the plurality of objects that have been detected, a slope gain joining portion 3 that joins the N-number of slope gains to create a correction gain, and a signal level correction portion 4 that corrects the input video signal based on the correction gain. The slope gain creation portions 2A to 2N are provided with distance calculation portions 2A1 to 2N1 for calculating distance information from the object information (object position information), and gain calculation portions 2A2 to 2N2 for calculating the slope gain from the distance information. Here, the position information is two-dimensional coordinate information on the two-dimensional display image that is formed by the video signal of a unit image (a video signal that can form a single display image; for example, this corresponds to the video signal of a single frame). It should be noted that hereinafter, a single unit image shall be described as a single frame.

The multiple object detection portion 1 detects objects from the input video signal data of a single frame stored in the memory portion 103, and outputs the result of this detection to the distance calculation portions 2A1 to 2N1. In other words, objects that viewers a likely to focus on (such as the image of a person's face) that are included in the display image that is formed by the input video signal of the single frame are recognized using object extraction technology (for example, the technology that is disclosed in JP 2006-228199A), and the position information of those detected objects (the two-dimensional coordinate information on the two-dimensional display image that is formed by the single frame input video signal) is detected. Then, the multiple object detection portion 1 outputs the position information of the detected objects to the distance calculation portions 2A1 to 2N1 in the order in which they were detected. In other words, the position information of the first object that is detected is output to the distance calculation portion 2A1, the position information of the second object that is detected is output to the distance calculation portion 2B1, and so forth, until the position information of the N-th object that is detected is output to the distance calculation portion 2N1. It should be noted that when the multiple object detection portion 1 detects a greater number of objects than N, it does not output position information for the number of objects beyond N (it does not perform the processing). As regards the order in which the object position information is output, the order can be that in which the objects are detected, as well as the order of the size of the detected objects (the area occupied by the object on the display imaged).

The distance calculation portion 2A1 to 2N1 receive the video signal that is output from the delay portion 102 and the output of the multiple object detection portion 1, and output distance information to the gain calculation portions 2A2 through 2N2. In other words, the distance calculation portions 2A1 through 2N1 calculate the distance between the position information of the input video signal and the position information of the object that has been detected by the multiple object detection portion 1. Here, the video signal that is input to the distance calculation portions 2A1 through 2N1 is a video signal that is obtained by the delay portion 102 delaying the input video signal by a predetermined time in order to match the timing of the processing. That is, the delay portion 102 delays the input video signal by the time that it takes for the memory portion 103 to store the video signal of a single frame and the multiple object detection portion 1 to obtain the position information of a plurality of objects and output the information to the distance calculation portions 2A1 through 2N1. Inputting the video signal that has been delayed by the delay portion 102 to the distance calculation portions 2A1 through 2N1, it is possible for the distance calculation portions 2A1 through 2N1 to calculate the distance between the position information of the input video signal and the position information of the object that has been detected by the multiple object detection portion 1.

The gain calculation portions 2A2 through 2N2 receive the distance information that has been output from the distance calculation portions 2A1 through 2N1, and calculate the gain from that distance information and output it to the slope gain joining portion 3.

The slope gain joining portion 3 receives the N-number of gains that have been found by the gain calculation portions 2A2 through 2N2, and finds a correction gain from the N-number of gains and outputs it to the signal level correction portion 4.

The signal level correction portion 4 corrects the signal level of the video signal that has been output by the delay portion 102 with the correction gain that has been found by the slope gain joining portion 3, and outputs this to the display device 104.

It should be noted that by the above structural components execute this processing in pixel units of the image that is formed by the video signal.

<1.2: Operation of the Video Signal Display Device>

The operation of the video signal display device 100 is described next.

The input video signal that is input to the video signal display device will be described first.

The input video signal is a signal that has position information and brightness information, and here it expresses the position information with as pixel information (x,y) on the display screen and expresses the brightness information as RGB signals (each 8 bits). If the input video signal is a high-definition broadcast signal (HDTV signal), then the x and y values are in the range of 1 to 1920, and 1 to 1080, respectively.

It should be noted that the video signal processing device is described for a case in which processing is performed in single frame units.

The input video signal is input first to the memory portion 103 and the delay portion 102.

In the memory portion 103, the input video signal for a single frame is stored and held as video signal data. The video signal data for a single frame that is held in the memory portion 103 can be accessed from the outside.

The multiple object detection portion 1 detects objects that viewers are prone to focus on (for example, images of people's faces) from the video signal data held in the memory portion 103, and outputs the properties of the objects. Here, faces are chosen as the objects that are readily noticed by viewers, and the faces that are present in the image that is formed by the video signal are detected as objects. As one method for face detection, it is possible to use the technology disclosed in JP 2006-228199A.

The object properties include the number N of detected faces, the x-coordinate and the y-coordinate of the center point of each face, and the width and height of the face.

The number of detected faces N is the number of faces in a single frame, where N is a natural number. In order to reduce the circuit size, an upper limit (LimN) can be provided for the number of objects to be detected, so as to limit the range of N to 0 to LimN.

Hereinafter, to simplify the notation, the x-coordinate and y-coordinate, and the width and height, of the i-th object will be written as $(x_i, y_i)$ and $(w_i, h_i)$. For example, when N=2, the first object is written as $(x_1, y_1)$ and $(w_1, h_1)$, and the second object is written as $(x_2, y_2)$ and $(w_2, h_2)$.

The multiple object detection portion 1 outputs the N-number of object properties that have been detected to slope gain creation portions 2A to 2N.

The slope gain creation portions 2A to 2N create a slope gain for lowering the emission amount in the display screen from approximately the center of the object, for each pixel of the image that is formed by the video signal (the video signal data corresponding to that pixel). Here, the emission amount is the amount of light that is radiated from the display screen when the video signal is displayed by the display device 104, and when the video signal is an RGB signal, the emission amount is expressed by $R\hat{\gamma}+G\hat{\gamma}+B\hat{\gamma}$. Here, γ indicates the panel gamma, and in general it is a value from 1.8 to 2.4. It should be noted that R is the R signal component of the video signal, that is, the RGB signal, G is the G signal component of the signal, and B is the B signal component of the signal.

The slope gain will be described using FIG. 4.

Figure 4A:
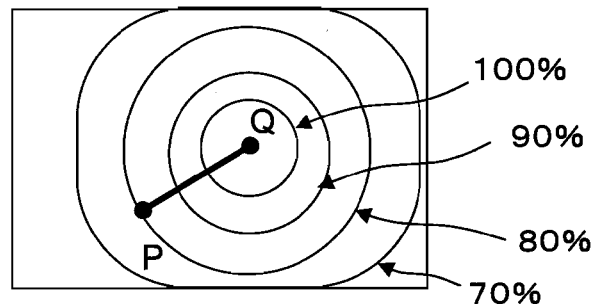
FIG. 4 is a diagram for describing the slope gain.

FIG. 4A shows an example of the display screen of the display device 104 of the video signal display device 100, and illustrates how the signal level drops from the approximate center Q of the object. In other words, it expresses the proportion by which the signal level is lowered from the approximate center Q of the object on the display screen.

Figure 4B:
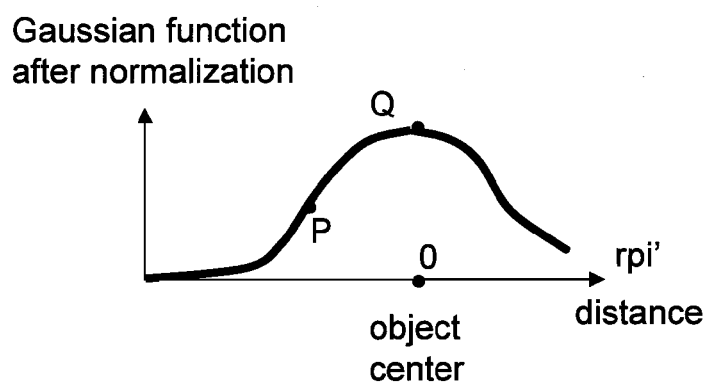

The contour lines in FIG. 4A are formed by joining pixels on the display screen that have the same slope gain with lines, and thus the values on the contour lines (the values shown by the arrows in FIG. 4A) indicate the degree to which the signal level drops due to the slope gain (=output signal level/input signal level). In FIG. 4, a Gassuian function is used to smoothly change the slope gain from the approximate center Q of the object. FIG. 4B shows the relationship between the distance and the value of the Gaussian function after normalization. In FIG. 4B the horizontal axis is distance and the vertical axis is the normalized Gaussian function value. It should be noted that the normalized Gaussian function is:

[1−{gauss(rpi')−gauss(1)}/{gauss(0)−gauss(1)}]

Here, rpi'=rpi/r_max.

The distance rpi is a scalar quantity that is found from a given pixel p and the approximate center of the i-th object (xi,yi), and whereas here it is a simple distance expressed by Equation 1, this is not necessarily a limitation, and for example, it may also be the distance in the oval space or the rectangular space discussed in JP 2002-116728A.

$$rpi=\{(xp-xi)^2+(yp-yi)^2\}^{0.5} \qquad \text{Eq. 1}$$

Here, (xp,yp) are the coordinates of the given pixel p, and (xi,yi) are the coordinates of the approximate center position of the i-th object.

The distances rpi that are calculated this way are output to the gain calculation portions 2A2 through 2N2 by the distance calculation portions 2A1 to 2N1, respectively.

Next, the gain calculation portions 2A2 through 2N2 find the slope gain gainpi from the distance rpi. The slope gain is a scalar quantity that is found from the distance, and here the slope gain is calculated by Equation 2, which uses a Gaussian function to smoothly change the slope gain such that viewers are less likely to detect a drop in the luminance.

$$gainpi=K\times[1-\{gauss(rpi')-gauss(1)\}/\{gauss(0)-gauss(1)\}] \qquad \text{Eq. 2}$$

Here K is a constant (actual number) between 0 and 1 that indicates the maximum luminance drop rate (=minimum luminance value/maximum luminance value). For example, the slope gain at point S in FIG. 4C (point of greatest distance from the object center) corresponds to this. rpi' is the rpi normalized by the distance between the screen center and the screen corner. In a case where rpi is larger than r_max, it becomes saturated at r_max. It should be noted that gauss expresses a Gaussian function, and is gauss(rpi')=exp[{−rpi'× rpi'/(2×σ×σ)}/σ]. Here, exp is exponent. Further, σ is a constant (=0.35) that defines the shape of the drop in luminance (luminance drop rate) with respect to the slope distance (distance rpi).

It should be noted that normalization is performed in order to set the range of the slope gain to 0 to K.

Figure 4C:
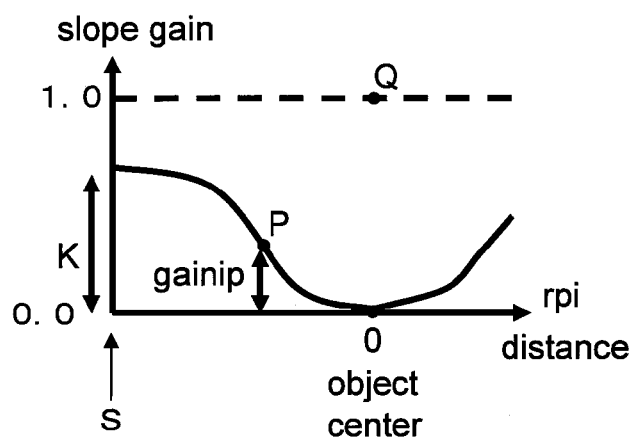

FIG. 4C shows the relationship between the distance (distance from the object center to the pixel) and the slope gain. In FIG. 4C the horizontal axis is based on the object center Q.

From the relationship between distance and slope gain that is shown in FIG. 4C, it is possible to create a slope gain gainpi of a given pixel p to the i-th object with the gain calculation portions 2A2 through 2N2. In other words, for each object (1, . . . i, . . . , N) it is possible to find a respective slope gain (gainp1, . . . , gainpi, . . . , gainpN).

It should be noted that it is not always necessary for there to be a continuous change in the slope gain based on the distance. It is only necessary that the slope gain results in a mean emission amount near the object center that is relatively higher than the mean emission amount of a region away from the object (corresponds to the display region on the display screen).

The slope gain that is created as above is output, for each pixel, from the gain calculation portions 2A2 to 2N2 of the slope gain creation portions 2A to 2N, to the slope gain joining portion 3.

For each pixel, the slope gain joining portion 3 joins the slope gains that have been calculated for the objects in order to calculate a single correction gain. For each pixel, the slope gain joining portion 3 sets the smallest slope gain of the objects as the correction gain. This is explained using FIG. 5.

Figure 5A:
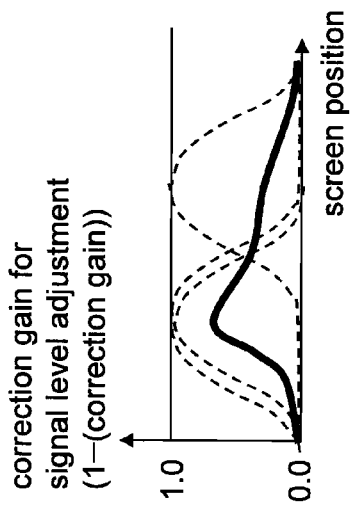
FIG. 5 is a diagram for describing joining of the slope gains.
Figure 5A:
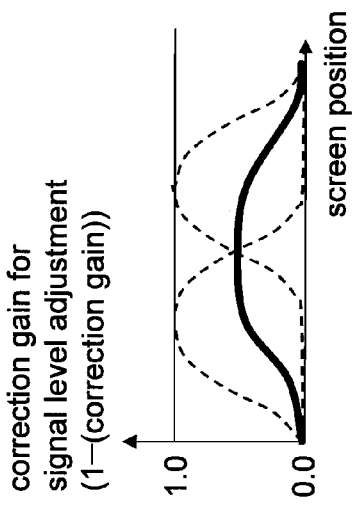
Figure 5A:
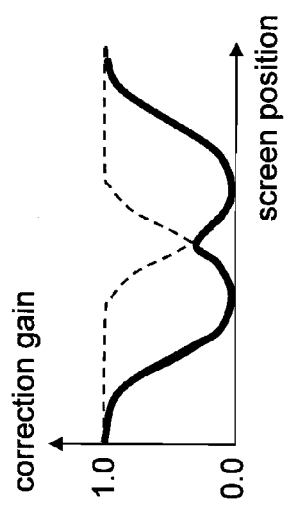
Figure 5B:
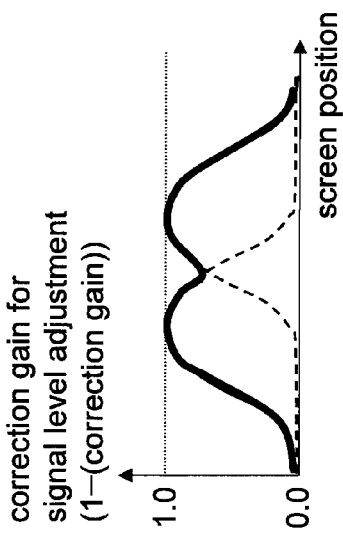

FIG. 5A is a diagram that shows the relationship between the screen position (position on the display screen) and the correction gain. FIG. 5B is a diagram that shows the relationship between the screen position (position on the display screen) and (1−(correction gain)) (hereinafter, this is referred to as the correction gain for signal level adjustment).

In FIG. 5, the broken line shows the slope gain of the objects (in FIG. 5A and 5B the object number N is 2), and the solid line shows the correction gain.

Figure 2:
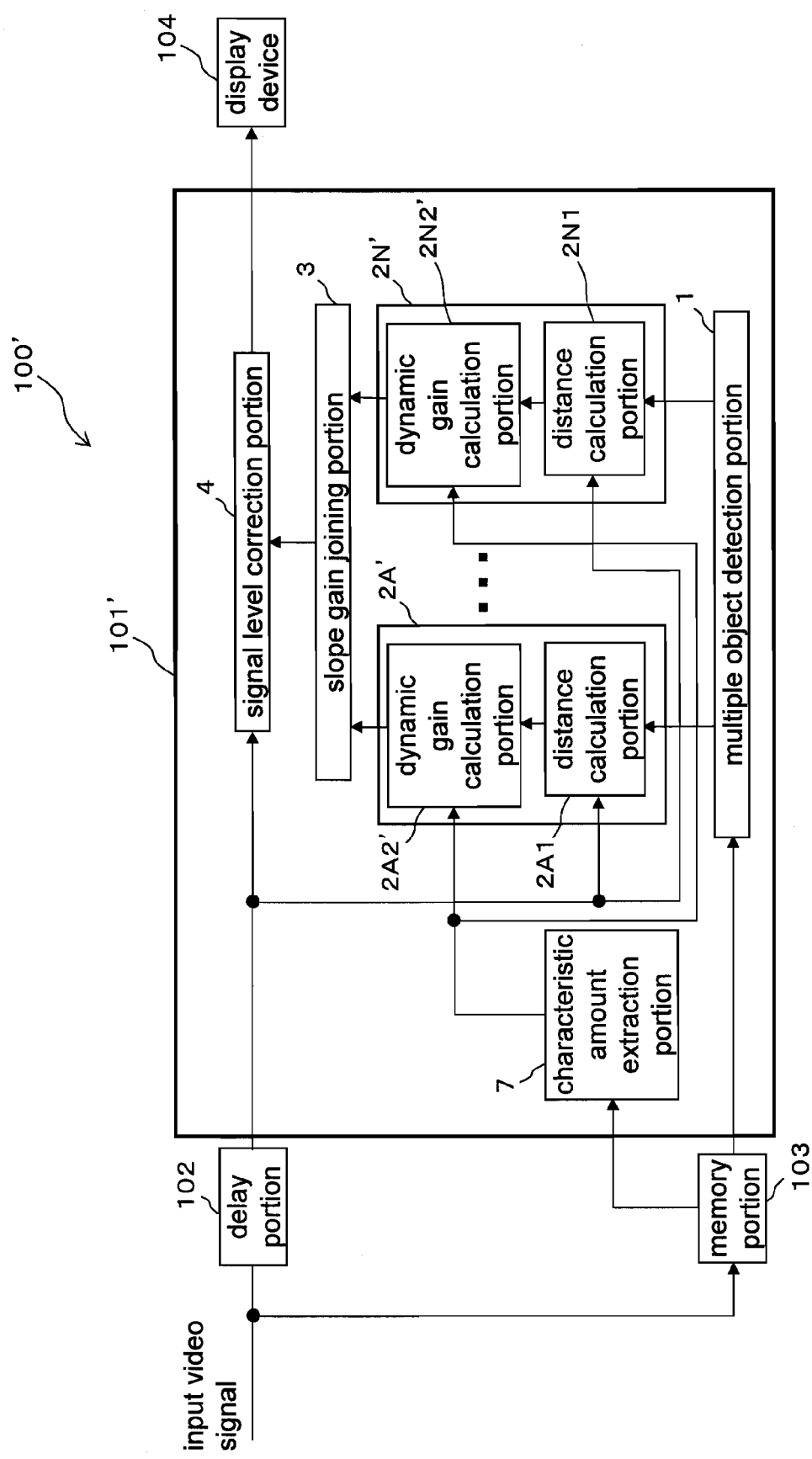
FIG. 2 shows the configuration of the video signal display device according to the first embodiment of the invention (modified example).

FIGS. 5C1 and 5C2 show a case in which the arithmetic mean value, rather than the smallest value, of the slope gains of the objects serves as the correction gain.

FIGS. 5C1 and 5C2 show the relationship between the screen position (position on the display screen) and the correction gain for signal level adjustment, and show the change in a state in which the two objects move and overlap and only a single object can be seen. Specifically, FIG. 5C1 shows a state in which three objects have been detected, where two objects are detected on the left and one object is detected on the right in FIG. 5C1, and shows the state immediately before the two objects on the left side overlap one another. FIG. 5C2 shows a state in which the two objects on the left have overlapped so that a single object is detected on the left and a single object is detected on the right.

If there is an instantaneous change from the state of FIG. 5C1, in which three objects are detected, to the state of FIG. 5C2, in which two objects are detected, then, as shown by the bold lines in FIGS. 5C1 and 5C2, the correction gain may significantly change due to the change in the number of detected objects, and the video may flicker on the display screen. In this case, if the change is from FIG. 5C1 to FIG. 5C2, then the correction gain for signal level adjustment near the location of the objects on the left changes significantly and flickering easily occurs on the display screen in this section.

For this reason, the method of taking the smallest value of the slope gain is used in order to find the correction gain.

When the method of finding the correction gain by taking the smallest value of the slope gain is used by the video signal display device 100, and the video signal is displayed on the display device 104, then flickering does not occur in the video that is displayed, and it is possible to obtain a natural sense of brightness on the display screen.

If there is not sufficiently high precision of face (object) detection by the multiple object detection portion 1, then there is also the method of using a method that does not use the mean value of the slope gains of the objects (a method of using a maximum value, a minimum value, or an approximately center value of the slope gains).

A method of finding a correction gain by taking the minimum value of the slope gain was described above, but this is not a limitation. For example, it is also possible to calculate the correction gain by multiplication or by taking the geometrical mean or the arithmetic mean.

In other words, if the correction gain is to be found by multiplication, then the correction gain is found by:

1−(1−gainp1)×. . . ×(1−gainpN).

If the correction gain is to be found by the geometrical mean, then the correction gain is found by:

1−{(1−gainp1)×. . . ×(1−gainpN)}/N.

If the correction gain is to be found by the arithmetic mean, then the correction gain is found by:

1−{(1−gainp1)×. . . ×(1−gainpN)}/N.

By calculating the correction gain in this way, the slope gain joining portion 3 can make the correction gain of pixels near the object center smaller than the correction gain of pixels between objects. Thus, on the display screen the emission amount of pixels near the object center can be increased compared to the emission amount of pixels between the objects. In other words, the emission amount is maintained near the object center, which viewers easily notice, whereas the emission amount of the surroundings is lowered, and thus power consumption can be reduced while retaining a sufficient sense of brightness in the display screen (particularly a sense of brightness with regard to objects that are easily noticed).

The hardware configuration of the video signal processing device may permit the slope gain (gainpN+1, . . . , gainpM) (where M is a natural number larger than N) to be input to the slope gain joining portion 3 from N or more circuits (circuits corresponding to the slope gain creation portions) if the number of detected faces is N, and in this case, it is sufficient to have the slope gain joining portion 3 use only as many as N slope gains in order to calculate the correction gain.

The correction gain that is calculated by the slope gain joining portion 3 is input to the signal level correction portion 4.

The signal level correction portion 4 corrects the input video signal that is output from the delay portion 102 in accordance with the correction gain, and outputs it to the display device 104. For example, it finds the drop in signal level from the product of the signal level of the input video signal and the correction gain, and outputs to the display device 104 a video signal whose signal level is obtained by subtracting this drop in signal level from the input video signal, as an output video signal. In other words, the signal level correction portion 4 executes the processing expressed by Equation 3.

$$\text{Out\_Rp}=\text{In\_Rp}-(\text{In\_Rp}\times\text{gainp}) \ \text{Out\_Gp}=\text{In\_Gp}-(\text{In\_Gp}\times\text{gainp}) \ \text{Out\_Bp}=\text{In\_Bp}-(\text{In—Bp}\times\text{gainp}) \quad \text{Eq. 3}$$

It should be noted that Eq. 3 may also be written as:

$$\text{Out\_Rp}=(1-\text{gainp})\times\text{In\_Rp} \ \text{Out\_Gp}=(1-\text{gainp})\times\text{In\_Gp} \ \text{Out\_Bp}=(1-\text{gainp})\times\text{In\_Bp}.$$

It should be noted that here the video signal is an RGB video signal, and the input video signals (RGB) and the output video signals (RGB) for a pixel p are written as In_Rp, In_Gp, and In_Bp, and Out_Rp, Out_Gp, and Out_Bp.

Figure 3A:
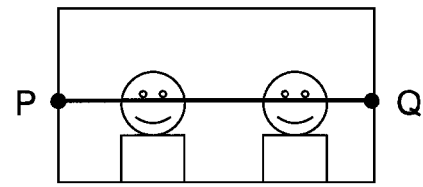
FIG. 3A is a schematic representation of a display screen that is formed by a video signal, on which two faces are displayed.
Figure 3B:
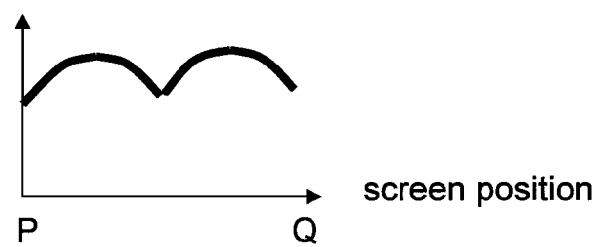
FIG. 3B is a diagram that shows the relationship between the correction gain for signal level adjustment and the screen position in the section between P and Q in FIG. 3A.

In a case where the input video signal for a single frame that forms an image like that shown in FIG. 3A is input to the signal level correction portion 4, the signal level of the video signal between P and Q in FIG. 3A is adjusted like in FIG. 3B by the signal level correction portion 4. It should be noted that in FIG. 3B, the horizontal axis is the screen position between P and Q, and the vertical axis is the correction gain for signal level adjustment (=1−(correction gain)).

The video signal that is output by the signal level correction portion 4 is input to the display device 104, which displays it as video.

The display device 104 is a self-emitting device that itself emits light and that has a display screen whose light can be adjusted. The display device 104 can adjust the emission amount for each pixel in correspondence with the output video signal from the signal level correction portion 4. As the display device 104, it is possible to use a plasma display in which high-pressure gas such as helium or neon has been filled in between two sheets of glass and which emits light by applying voltage to this, an organic EL that uses an organic substance that emits light when voltage is applied, a CRT (cathode ray tube) that uses an electron gun, or a FED (field emission display) in which electrons are released into a vacuum from a planar electron emission source (emitter) and hit a fluorescent material and cause light emission.

Thus, with the video signal display device 100, even when the display screen contains numerous regions that are easily noticed by viewers, it is possible to obtain a sufficient sense of brightness (particularly with respect to regions that contain objects that are easily noticed) in the display screen and to keep down power usage. Further, a natural image can be displayed without causing flickering in the video even when objects overlap on the display screen.

SPECIFIC EXAMPLE

The video signal display device 100 according to the first embodiment is described below using specific values.

The case that is described is one in which the pixel number of a single frame image that is formed by the input video signal is 1920 w ×1080 h pixels, and the multiple object detection portion 1 has detected two faces. The two faces that are detected by the multiple object detection portion 1 are regarded as face 1 and face 2, and the center point (position information) of face 1 is (600,540) and the center point (position information) of face 2 is (1200,540).

In the case that is described, the slope gain creation portions 2A through 2N calculate the correction gain for a pixel p whose coordinates are (800,540).

First, the slope gain gain1 for face 1 is found.

Using Eq. 1, the distance rp1 is found. That is, $$rp1=\{(800-600)^2+(540-540)^2\}^{0.5}=200.$$

The slope gain is found using Eq. 2. That is, $$\text{gain1}=0.064.$$

Similarly, the slope gain gain2 for face 2 is found. That is, $$rp2=\{(800-1200)^2+(540-540)^2\}^{0.5}=400, \text{ and}$$

$$\text{gain2}=0.212.$$

The maximum luminance drop rate K is set to K=0.5, and the constant a that determines the shape of the Gaussian function is set to a=0.35.

The maximum value r_max of the distance is, in this case, the distance between the four corners of the display screen and the center of the display screen, and thus is found by Equation 4.

$$r\_\max=\{(0-960)^2+(0-540)^2\}^{0.5}\approx1101 \quad \text{Eq. 4}$$

In the slope gain joining portion 3 the number of faces detected is N=2 when the minimum value of the slope gain is found, and thus it finds the smaller value of gainp1 and gainp2 and sets that smaller value as the correction gain.

In other words, in this case the correction gain is Min (0.064,0.212)=0.064. It should be noted that here, Min ( ) is a function for finding the smallest value.

Lastly, the signal level correction portion 4, if the input video signal of the pixel p is (In_p_R,In_p_G,In_p_B)=(255, 128,0), sets the level of the output video signal to (Out_p_R, Out_p_G,Out_p_B)=(239,120,0) for R,G, and B, respectively, through Eq. 3.

By performing the same processing for all pixels, the signal level correction portion 4 can obtain an output video signal.

MODIFIED EXAMPLE

Next, a video signal display device 100' that serves as a modified example of the video signal display device 100 according to the first embodiment is described.

FIG. 2 shows the configuration of the video signal display device 100'. It should be noted that elements that are the same as those of the video signal display device 100 have been assigned the same reference numerals as before and are not described.

The video signal display device 100' differs from the video signal display device 100 in that in its video signal processing device 101' a characteristic amount extraction portion 7 is further provided, and in that the gain calculation portions of the slope gain creation portions 2A' to 2N' have been substituted with dynamic gain calculation portions 2A2' to 2N2'.

The characteristic amount extraction portion 7 extracts a characteristic amount C (discussed later) of the input video signal from a single frame image from the video signal data of a single frame, which are stored by and held in the memory portion 103.

The dynamic gain calculation portions 2A2' to 2N2' change the maximum luminance drop rate K based on the characteristic amount C that has been found by the characteristic amount extraction portion 7, and calculate the slope gain with the changed maximum luminance drop rate K.

In the video signal display device 100, the maximum luminance drop rate K was a fixed value regardless of the video signal, but in the video signal display device 100', K is dynamically changed for each frame in accordance with the input video signal, in order to further increase the sense of brightness.

In other words, a characteristic amount extraction portion that extracts a characteristic amount C of the input video signal from the input video signal each frame, and dynamic slope gain creation portions that use the characteristic amount C to output a slope gain that corresponds to that frame, are used.

Thus, signal level correction that uses a maximum luminance drop rate K that is optimal in a given frame is executed.

Second Embodiment

Figure 6:
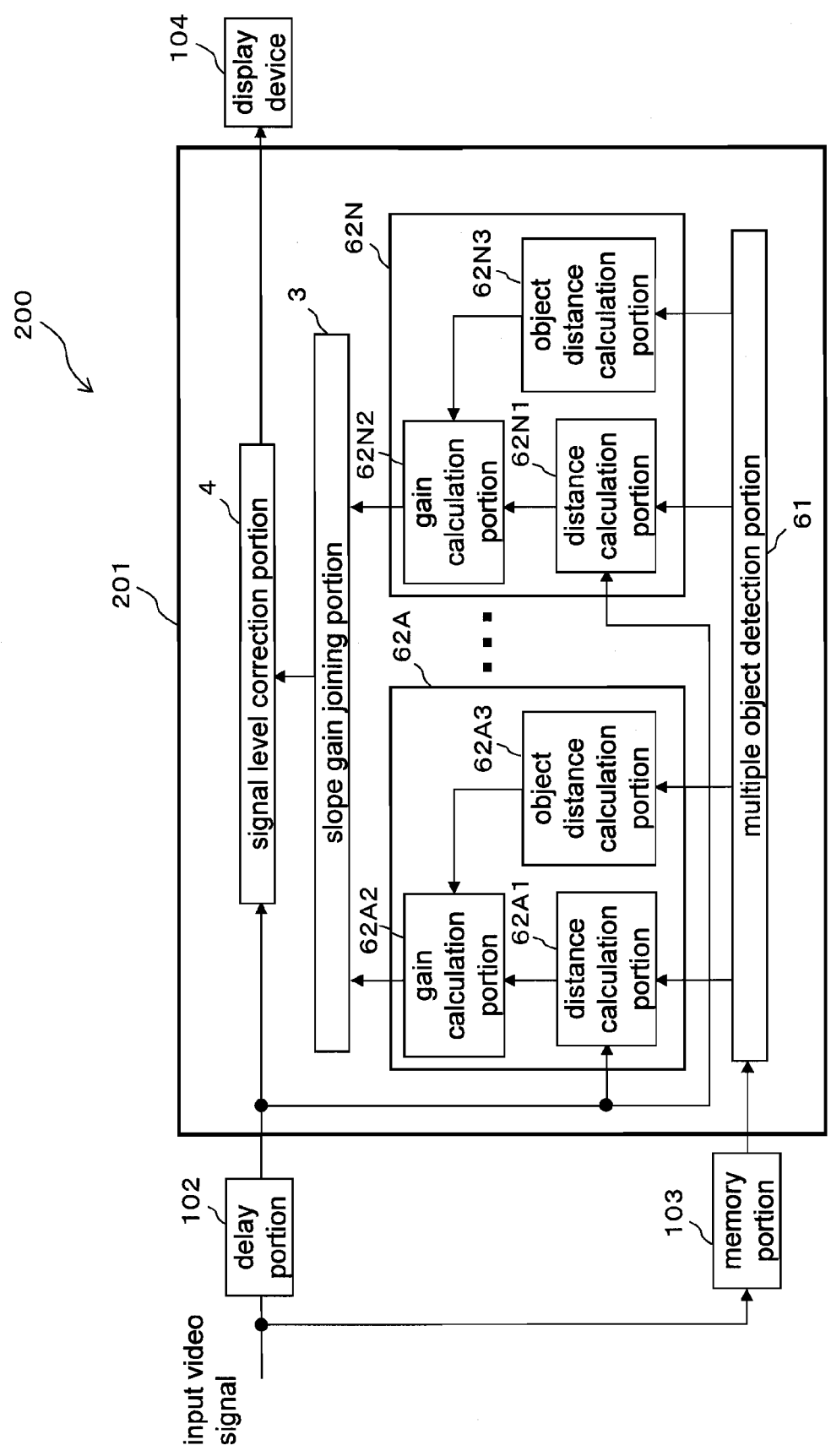
FIG. 6 shows the configuration of the video signal display device according to a second embodiment of the invention.

FIG. 6 shows the configuration of a video signal display device 200 according to a second embodiment. It should be noted that elements that are the same as those of the video signal display device 100 have been assigned identical reference numerals and will not be described.

The video signal display device 200 differs from the video signal display device 100 in that the slope gain creation portions 62A to 62N have been further provided with object distance calculation portions 62A3 to 62N3, and the slope gain creation portions 62A to 62N change the slope gain according to the distance between objects.

It should be noted that the distance calculation portions 62A1 to 62N1 are the same as the distance calculation portions 2A1 to 2N1 of the first embodiment.

The object distance calculation portions 62A3 to 62N3 calculate the sum of the distance between objects. The object distance objRi, which is the sum of the distance between an i-th object and the various objects, is calculated with Equation 5.

$$objRi = \sum_{j=1}^{N} \sqrt{\{(x_j - x_i)^2 + (y_j - y_i)^2\}}$$ Eq. 5

Here, j has a range of 1 to N.

In the gain calculation portions 62A2 to 62N2, the maximum luminance drop rate K is linked to the object distance objRi. For example, the maximum luminance drop rate Ki of the i-th object is set to $Ki = K \times objRi$. The formula for calculating the slope gain is changed accordingly from Eq. 2 to Eq. 6.

$$gainpi = Ki \times [1 - \{gauss(rpi') - gauss(1)\} / \{gauss(0) - gauss(1)\}]$$ Eq. 6

Figure 8A:
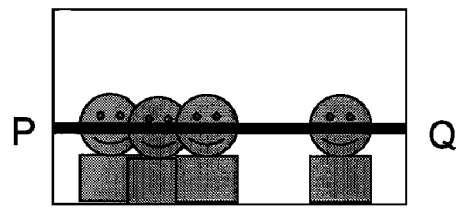
FIG. 8A is a schematic representation of a display screen that is formed by a video signal, in which the degree of concentration differs within the display screen.
Figure 8B:
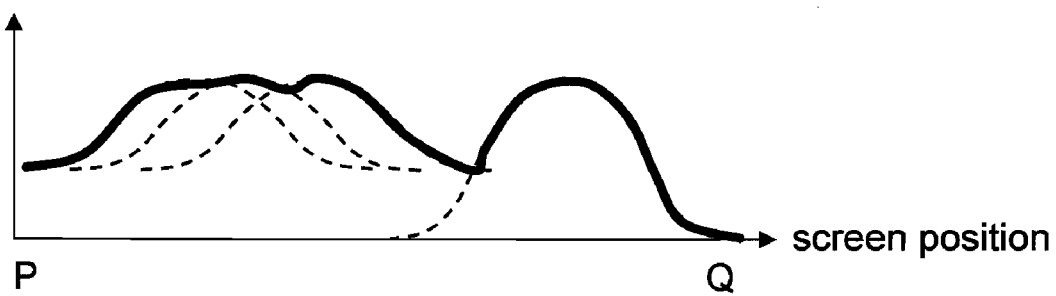
FIG. 8B is a diagram that shows the relationship between the correction gain for signal level adjustment and the screen position in the section between P and Q in FIG. 8A.

In a case where an input video signal of a single frame that forms an image like that shown in FIG. 8A is input to the signal level correction portion 4, the signal level of the video signal between P and Q in FIG. 8A is adjusted as shown in FIG. 8B by the signal level correction portion 4. It should be noted that in FIG. 8B, the horizontal axis is the screen position between P and Q, and the vertical axis is the correction gain for signal level adjustment (=1−(correction gain)). The three objects on the left in FIG. 8A are close together and the object distance objRi is small, and thus the maximum luminance drop rate K is set to a small value. On the other hand, the single object on the right side of FIG. 8A is alone and the object distance objRi is large, and thus the maximum luminance drop rate K is set to a large value.

Thus, the correction gain can be changed differently for areas in which several objects are concentrated and areas in which objects are spread out. The video signal display device 200 can therefore further increase the sense of brightness by making even brighter those areas in which sections that viewers readily noticed are concentrated.

MODIFIED EXAMPLE

Figure 7:
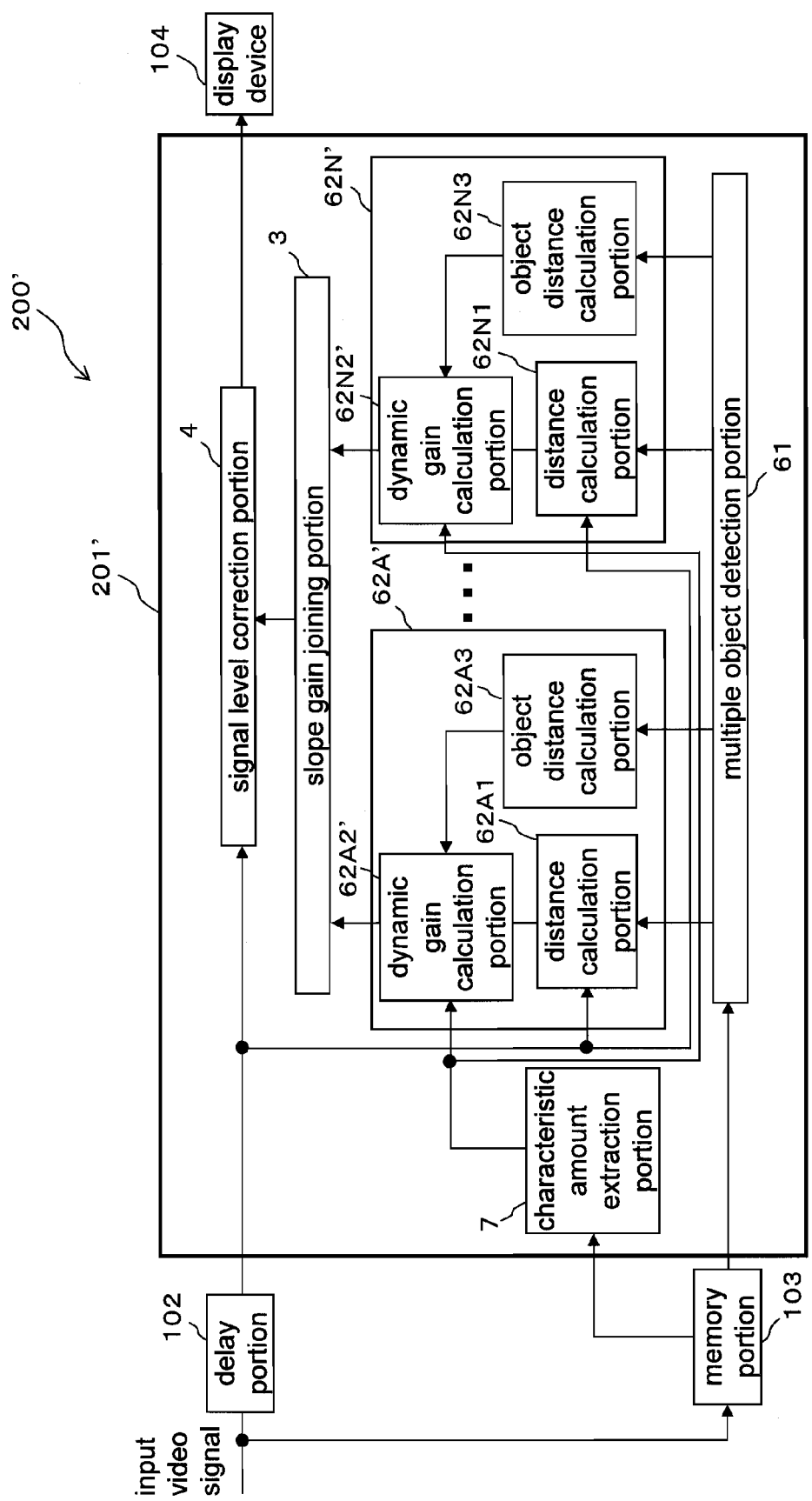
FIG. 7 shows the configuration of the video signal display device according to the second embodiment of the invention (modified example).

Although the maximum luminance drop rate K was a constant value regardless of the video signal, in order to achieve an even greater sense of brightness it is also possible to dynamically change the maximum luminance drop rate K for each frame in accordance with the input video signal. A video signal display device 200' that dynamically changes the maximum luminance drop rate K for each frame in accordance with the input video signal is shown in FIG. 7. It should be noted that elements that are the same as those of the video signal display devices 100, 100', and 200 have been assigned identical reference numerals and will not be described.

The video signal display device 200' differs from the video signal display device 200 in that in its video signal processing device 201' a characteristic amount extraction portion 7 is further provided, and in that the gain calculation portions of the slope gain creation portions 62A' to 62N' have been substituted with dynamic gain calculation portions 62A2' to 62N2'.

The characteristic amount extraction portion 7 outputs a frequency band component, for example, as the characteristic amount. The frequency band component is a power of the frequency component of a specific region of the input video signal.

First, the brightness signal (InY) is found from the input video signal through Eq. 7.

$$InY\_i = 0.3 \times In\_i\_R + 0.6 \times In\_i\_G + 0.1 In\_i\_B$$ Eq. 7

Next, to obtain the frequency band component from the brightness signal InY, the input signal InY is subjected to Fourier transformation to find F(w). The power at a frequency band of 0 to 1 cpd is found from Equation 8.

$$C = \int |F(w)|^2 \, dw \text{ (integration of 0 } cpd \text{ to 1 } cpd\text{)}$$ Eq. 8

Here, cpd (cycle per degree) is the spatial frequency. For example, when the horizontal pixel number of the display screen is 1024 and its viewing angle is 33 degrees, the maximum value of the spatial frequency is approximately 15.5 cpd.

It should be noted that it is also possible to use a low-pass filter in order to find the frequency band component. By doing this it is possible to reduce the circuit scale over that when using Fourier transformation (not only Fourier transformation but wavelet transformation and DCT transformation as well). It is also possible to extract a plurality of characteristic amounts for each frame. In addition to the frequency band component, it is also possible to use the mean luminance, the mean saturation, or the histogram distribution as the characteristic amount.

Figure 9:
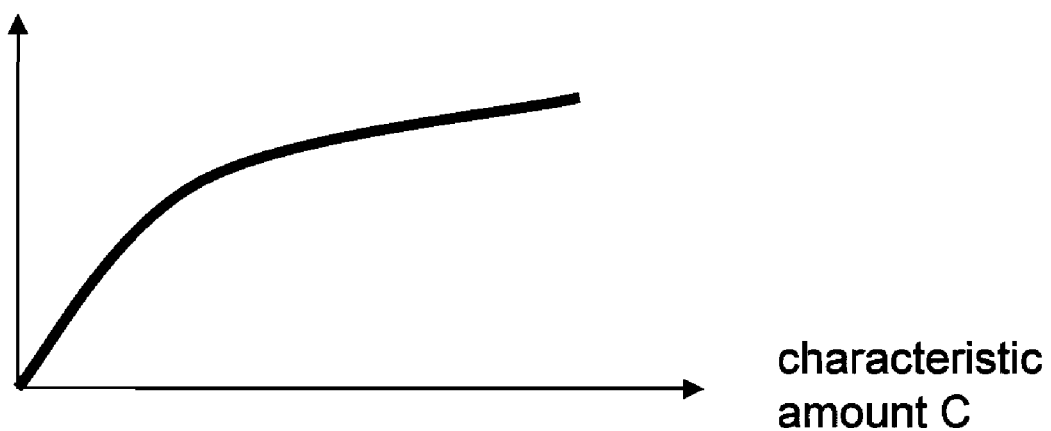
FIG. 9 is a diagram that shows the relationship between the characteristic amount and the maximum luminance drop rate.

The dynamic gain calculation portions 62A2' to 62N2' find the dynamic maximum luminance drop rate that corresponds to the characteristic amount C that is found by the characteristic amount extraction portion 7. At that time, they find the largest dynamic maximum luminance drop rate KK at which a deterioration in picture quality due to the luminance slope cannot be detected by subjective evaluation. For example, the characteristic amount C and the dynamic maximum luminance drop rate KK are corresponded to one another as shown in the table of FIG. 9. Accordingly, the equation for calculating the slope gain is changed from Eq. 2 to Eq. 9. That is, the dynamic gain calculation portions 62A2' to 62N2' calculate the slope gain by performing processing that corresponds to Eq. 9.

$$\text{gain}pi = KK \times [1 - \{\text{gauss}(rpi') - \text{gauss}(1)\} / \{\text{gauss}(0) - \text{gauss}(1)\}] \qquad \text{Eq. 9}$$

Thus, the video signal display device 200' can perform processing that is in accord with the input video signal, and thus it is possible to maintain a picture quality on the display screen at which the luminance slope does not stand out, while further increasing the sense of brightness.

Third Embodiment

Figure 10:
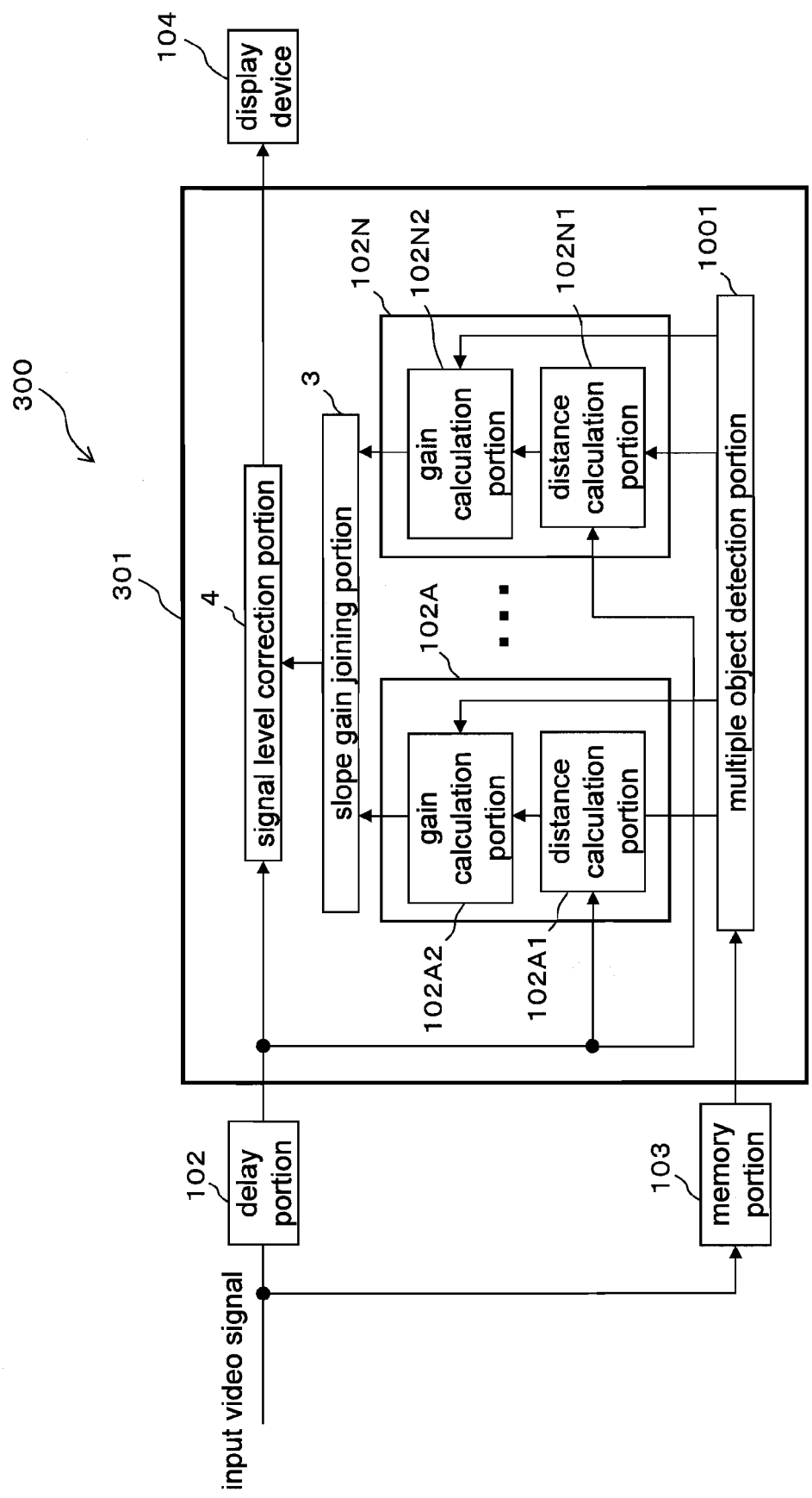
FIG. 10 shows the configuration of the video signal display device according to a third embodiment of the invention.

FIG. 10 shows the configuration of a video signal display device 300 according to a third embodiment. It should be noted that elements that are the same as those of the video signal display devices of the previous embodiments have been assigned identical reference numerals and will not be described.

The video signal display device 300 differs from the video signal display devices of the foregoing embodiments in that the slope gain creation portions 102A to 102N change the slope gain according to the properties of the objects.

It should be noted that the distance calculation portions 102A1 to 102N1 are the same as the distance calculation portions 2A1 to 2N1 of the first embodiment.

The properties of the objects that are detected by the multiple object detection portion 1001 include the object size (w,h) and the number N of detected objects, as mentioned in previous embodiments.

The gain calculation portions 102A2 to 102N2 receive the object properties and calculate the size of the i-th object sizei with Equation 10.

$$\text{size}i = L \times (wi \times hi) \qquad \text{Eq. 10}$$

Here, L is a constant.

The equation for calculating the slope gain is changed from Eq. 2 to Eq. 11, based on the size of the object sizei. That is, the gain calculation portions 102A2 to 102N2 calculate the slope gain through processing that corresponds to Equation 11.

$$\text{gain}pi = Ki \times [1 - \{\text{gauss}(rpi'/\text{size}i) - \text{gauss}(1)\} / \{\text{gauss}(0) - \text{gauss}(1)\}] \qquad \text{Eq. 11}$$

Figure 12A:
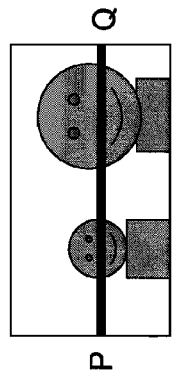
FIG. 12A is a schematic representation of a display screen that is formed by a video signal, on which faces of different sizes are displayed.
Figure 12B:
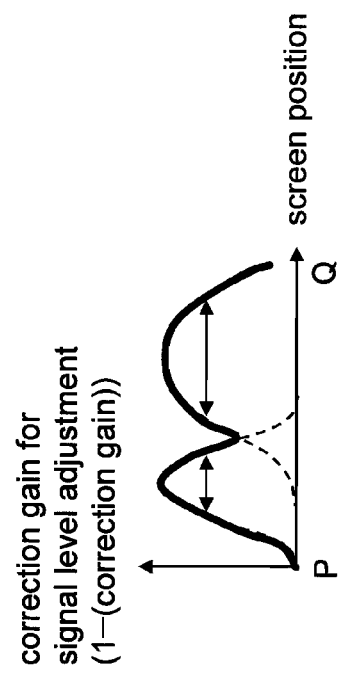
FIG. 12B is a diagram that shows the relationship between the correction gain for signal level adjustment and the screen position in the section between P and Q in FIG. 12A.

In a case such as FIG. 12A, in which an input video signal for a single frame that forms an image in which there are two faces of different sizes has been input to the signal level correction portion 4, the signal level correction portion 4 adjusts the signal level like in FIG. 12B. It should be noted that in FIG. 12B the horizontal axis is the screen position between P and Q, and the vertical axis is the correction gain for signal level adjustment (=1−(correction gain)). The left object in FIG. 12A is small and thus the slope gain is set so as to precipitously lower the correction gain for signal level adjustment from the object center toward its periphery. On the other hand, the object on the right in FIG. 12A is large and thus the slope gain is set so as to gently lower the correction gain for signal level adjustment from the object center toward its periphery.

Therefore, it is possible to adjust the amount of change in the slope gain with respect to the distance when the size of a face (object) that viewers easily notice is large. Accordingly, with the video signal display device 300 it is possible to raise the luminance of the face (object) overall when the face (object) is large and to not raise the luminance of the area around the face (object) when the face (object) is small, and thus, because it is possible to effectively use the limited amount of power, it is possible to curtail power usage by the video signal display device 300 while further increasing the sense of brightness.

The equation for calculating the slope gain is changed from Eq. 2 to Eq. 12, based on the number N of detected objects. That is, the gain calculation portions 102A2 to 102N2 calculate the slope gain by processing that corresponds to Eq. 12.

$$\text{gain}pi = Ki \times [1 - \{\text{gauss}(rpi' \times N) - \text{gauss}(1)\} / \{\text{gauss}(0) - \text{gauss}(1)\}] \qquad \text{Eq. 12}$$

Figure 12C:
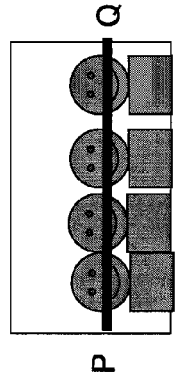
FIG. 12C is a schematic representation of a display screen that is formed by a video signal, on which four faces are displayed.
Figure 12D:
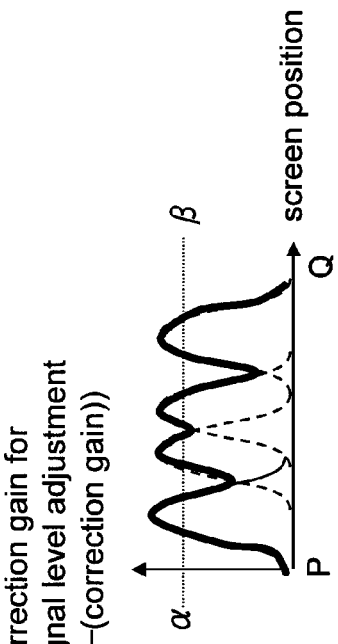
FIG. 12D is a diagram that shows the relationship between the correction gain for signal level adjustment and the screen position in the section between P and Q in FIG. 12C.

In a case such as FIG. 12C, in which an input video signal for a single frame that forms an image with many detected objects is input to the signal level correction portion 4, the signal level correction portion 4 adjusts the signal level like in FIG. 12D. It should be noted that in FIG. 12D the horizontal axis is the screen position between P and Q, and the vertical axis is the correction gain for signal level adjustment (=1−(correction gain)). If there are many detected objects like in FIG. 12C, then the slope gain is set so as to precipitously lower the correction gain for signal level adjustment from the object center toward its periphery. Thus, even if there are many detected objects on the display screen, it is possible to generate sections in which the correction gain for signal level adjustment is high and sections in which it is low, and power use by the video signal display device 300 can be kept down. In other words, in FIG. 12D, the waveform of the correction gain for signal level adjustment that corresponds to each object has a steep hill shape, and thus the waveform that takes the maximum value of the correction gain for signal level adjustment of an object (the waveform of the solid line in FIG. 12D) is a waveform in which there are peaks and troughs due to the occurrence of relatively high and relatively low sections compared to the dotted line αβ in FIG. 12D. Consequently, sections in which the luminance level is lowered occur on the display screen of the display device 104, and thus it is possible to maintain the sense of brightness at the object periphery while suppressing power consumption by the video signal display device 300.

MODIFIED EXAMPLE

Figure 11:
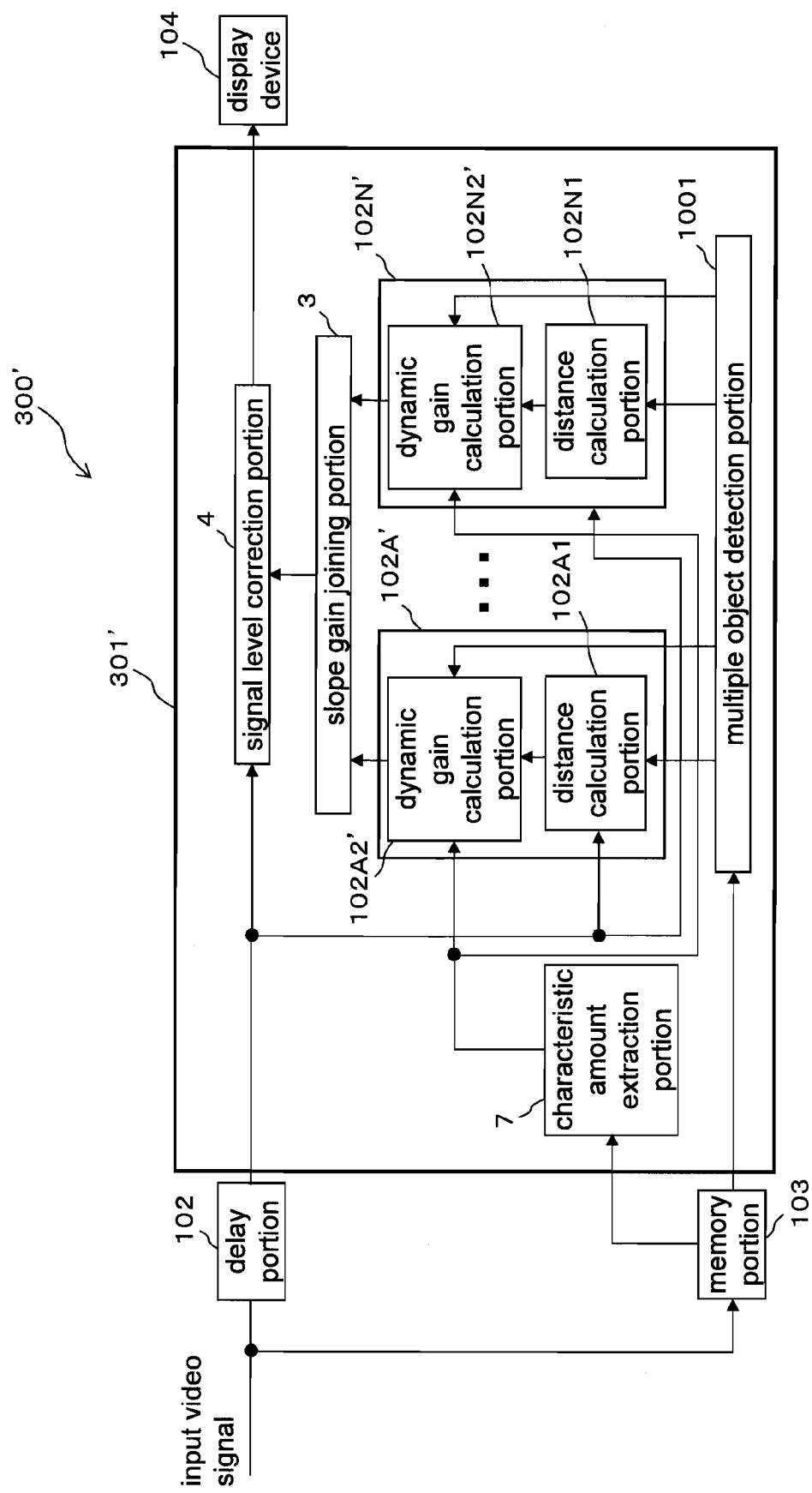
FIG. 11 shows the configuration of the video signal display device according to the third embodiment of the invention (modified example).

It should be noted that in the third embodiment as well, as shown by the video signal display device 300' of FIG. 11 it is possible to add a characteristic amount extraction portion 7, and to substitute dynamic gain calculation portions 102A2' to 102N2' for the gain calculation portions 102A2 to 102N2, and like in the second embodiment, to dynamically change the maximum luminance drop rate for each frame in accordance with the input video signal in order to further increase the sense of brightness.

Fourth Embodiment

Figure 13:
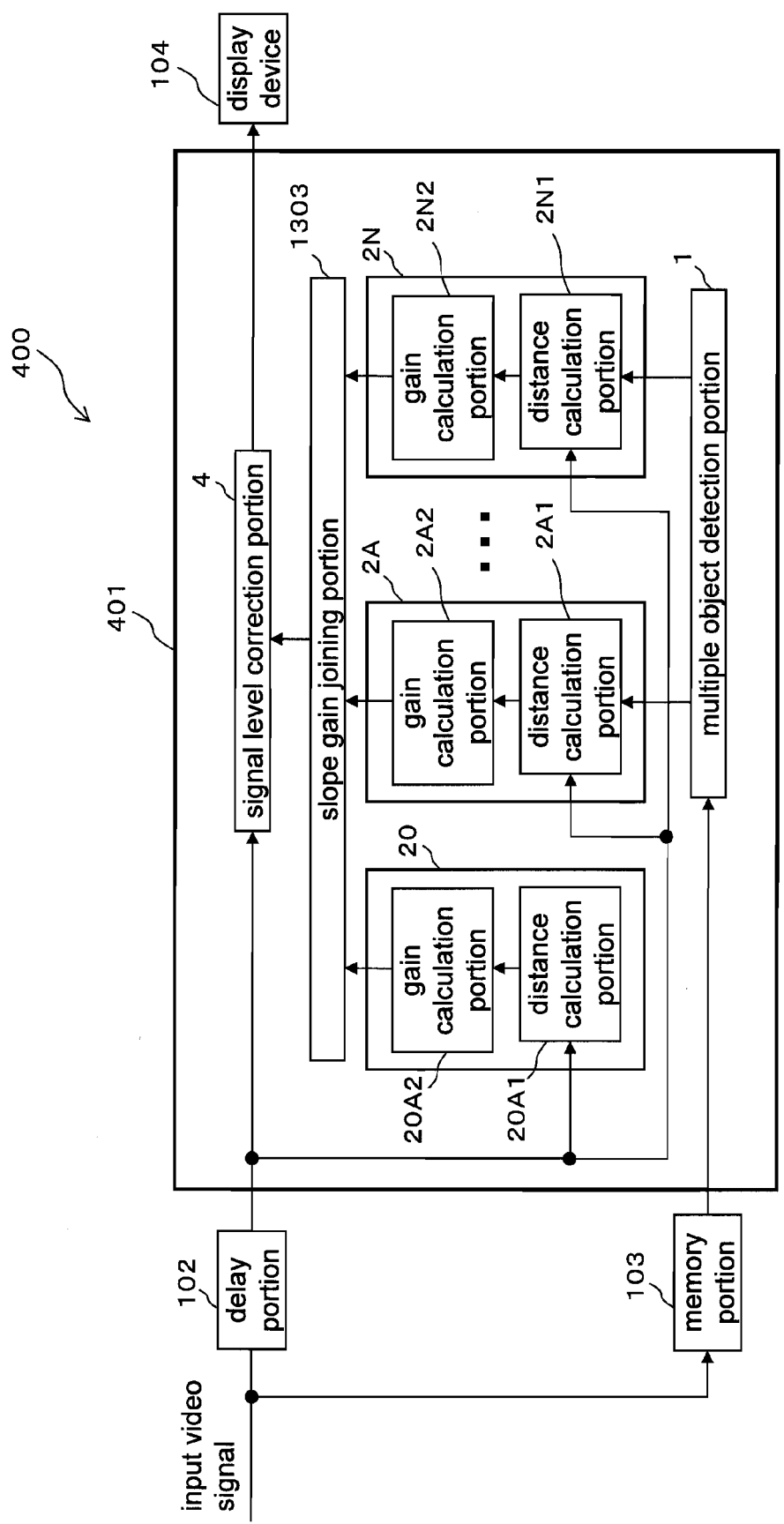
FIG. 13 shows the configuration of the video signal display device according to a fourth embodiment of the invention.

FIG. 13 shows the configuration of a video signal display device 400 according to a fourth embodiment. It should be noted that elements that are the same as those of the video signal display devices of the previous embodiments have been assigned identical reference numerals and will not be described.

The video signal display device 400 differs from the video signal display device 100 according to the first embodiment in that it further includes a slope gain creation portion 20.

Viewers tend to focus on the center of the display screen when there are no detectable faces (objects) (N=0) in the image of a single frame that is formed by the input video signal, and thus the slope gain creation portion 20 calculates a gainp0 with the object center point (x0,y0) as the center of the display screen. The video signal display device 400 executes conventional processing using this gainp0 when no faces are detected. In other words, the signal level correction portion 4 of the video signal display device 400 performs signal level correction on the input video signal using only the slope gain gainp0 that has been calculated by the slope gain creation portion 20.

Further, when a face (object) is detected in a single frame image that is formed by an input video signal, the area of the face (object) can be made locally bright. Accordingly, the gain calculation portions 20A2 and 2A2 to 2N2 calculate the slope gain using Equation 13.

$$\text{gain} pi = Ki \times [1 - \{\text{gauss}(rpi \times Ai) - \text{gauss}(1)\} / \{\text{gauss}(0) - \text{gauss}(1)\}] \quad \text{Eq. 13}$$

Figure 15A:
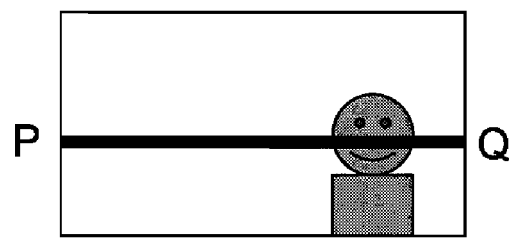
FIG. 15A is a schematic representation of a display screen that is formed by a video signal, on which one face is displayed.
Figure 15B:
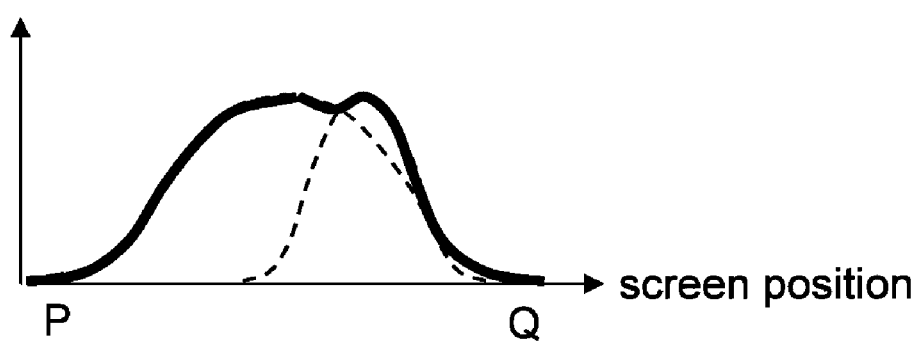
FIG. 15B is a diagram that shows the relationship between the correction gain for signal level adjustment and the screen position in the section between P and Q in FIG. 15A.
Figure 16A:
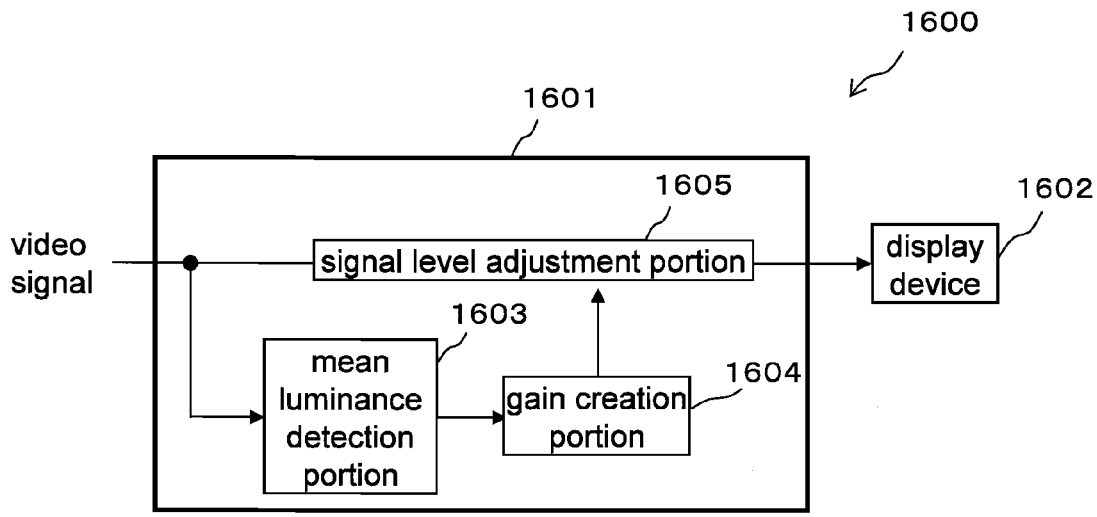
FIG. 16 is a diagram for describing a conventional video signal display device.
Figure 16B:
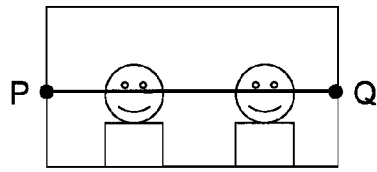
Figure 16C:
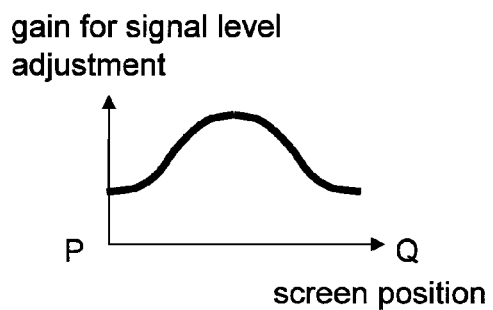

Here, Ai is a variable that changes for each object, and for the 0-th object it is set to A0=1 (A0 is the variable for the gain calculation portion 20A2), and for objects other than the 0-th object, Ai is set to a number larger than 1 (Ai is a variable for the gain calculation portions 2A2 to 2N2). Thus, if the input image signal of a single frame that forms an image such as that of FIG. 15A is input to the signal level correction portion 4, then the signal level correction portion 4 adjust the signal level like in FIG. 15B. It should be noted that in FIG. 15B the horizontal axis is the screen position between P and Q, and the vertical axis is the correction gain for signal level adjustment (=1−(correction gain)). As shown in FIG. 15B, with the video signal display device 400 it is possible to locally brighten only the face (object) area.

MODIFIED EXAMPLE

Figure 14:
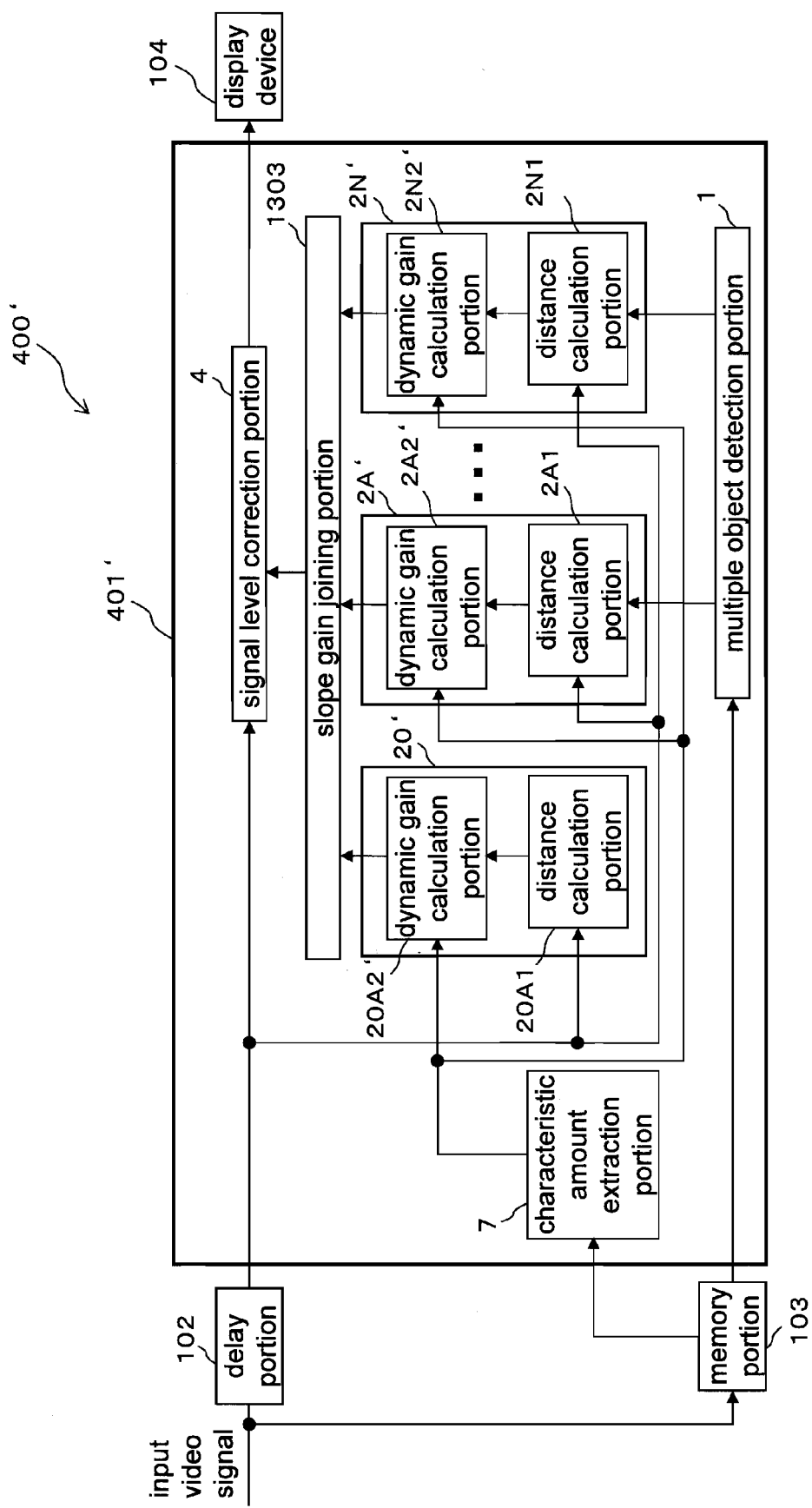
FIG. 14 shows the configuration of the video signal display device according to the fourth embodiment of the invention (modified example).

It should be noted that in the fourth embodiment as well, as illustrated by the video signal display device 400' shown in FIG. 14, it is possible to add a characteristic amount extraction portion 7, and to substitute dynamic gain calculation portions 20A2' and 2A2' to 2N2' for the gain calculation portions 20A2 and 2A2 to 2N2, and like in the second embodiment and the third embodiment, to dynamically change the maximum luminance drop rate for each frame in accordance with the input video signal in order to further increase the sense of brightness.

Other Embodiments

It is also possible to achieve video signal display devices and video signal processing devices by freely combining any of the functions that are achieved by the video signal display devices and the video signal processing devices described in the foregoing embodiments.

The foregoing embodiments described the case of video, but it is not necessary to limit the invention in this way, and it is also possible to adopt the invention for still images as well.

The foregoing embodiments described processing in frame units, but it is not necessary to limit the invention in this way, and it is also possible to perform processing in field units as well.

The foregoing embodiments described a case in which processing is performed for each pixel, but it is not necessary to limit the invention in this way, and for example, in some of the video signal display devices of the foregoing embodiments, it is also possible to perform processing in units of block that are made from a plurality of pixels, and in some of the video signal processing devices of the foregoing embodiments it is possible to perform decimation and then perform processing.

A part or all of each functional block that executes various functions described in the foregoing embodiments may be realized by a separate integrated circuit, or a one tip integrated circuit as a part of them or as a whole.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit.

It is possible to use an FPGA (Field Programmable Gate Array) that is programmable after the LSI is produced or a silicon figurable processor that can restructure connection or setting of circuit cells in the LSI.

Furthermore, if another technique for integrating circuits rather than he LSI appears with the progress of semiconductor technology, then that technique may be utilized for integrating the functional blocks. Biotechnology has the potential for such technology.

Each of the processing functions explained in the aforementioned embodiments may be carried out by hardware, or by software. Alternatively, it may be carried out by mixed processing using the hardware and software.

Examples of cases in which the invention is achieved by software include processing using microprocessors, ROMs, and RAMs, for example, connected by a bus. In this case, the memory portion 103 can be achieved by a RAM, for example, bus connected to the microprocessor. For example, the input video signal data of a single frame (single field) is stored on the RAM, and processing corresponding to the functioning of the video signal processing device is executed by software. In this case, when handling video it goes without saying that it is necessary to complete the software processing within the update period (for example, a single frame period or a single field period) in which the video is displayed by the display device 104. Further, in this case it is also possible to obviate the delay portion 102 if the data that are input to the distance calculation portion are video signal data that have been stored on the RAM.

It should be noted that the specific configuration of the invention is not limited to the foregoing embodiments, and various changes and modifications are possible in a range that does not depart from the gist of the invention.

The video signal processing device, video signal processing method, video signal processing program, integrated circuit, and video signal display device according to the invention allow a sufficient sense of brightness to be obtained on the display screen, even if the display screen has more than one region that is easily noticed by viewers, and can suppress power usage, and thus are useful in industrial fields relating to video devices and can be implemented in those fields.

What is claimed is:

1. A video signal processing device for creating a display video signal to be displayed on a light-adjustable display device, the video signal processing device comprising:
    a multiple object detection portion operable to detect a plurality of objects that are included in a unit image that is formed by an input video signal;
    a correction gain calculation portion operable to calculate a correction gain when the unit image is displayed on the light-adjustable display device; and
    a signal level correction portion operable to (i) correct the input video signal in accordance with the correction gain and (ii) output the result to the light-adjustable display device as the display video signal,
    wherein the correction gain is calculated so that an emission amount at a first point on a display screen is lower than an emission amount at a second point on the display screen, and
    wherein (i) the first point on the display screen is in a region between two points substantially located at the center of two objects, respectively, from among the plurality of objects, and (ii) the second point on the display screen is one of the two points substantially located at the center of the two objects.

2. The video signal processing device according to claim 1, wherein the correction gain calculation portion includes (i) a number of slope gain creation portions equal to a maximum number of detectable objects, each of the slope gain portions being operable to calculate a slope gain for a corresponding object from among the plurality of objects detected by the multiple object detection portion, and (ii) a slope gain joining portion operable to join the slope gain calculated for each of the plurality of objects detected by the multiple object detection portion to create a single correction gain.

3. The video signal processing device according to claim 2, wherein the slope gain creation portions are in correspondence with the plurality of objects detected by the multiple object detection portion based on the order of detection of the plurality of objects by the multiple object detection portion.

4. The video signal processing device according to claim 2, wherein the slope gain creation portions are in correspondence with the plurality of objects detected by the multiple object detection portion based on the size of the plurality of objects.

5. The video signal processing device according to claim 2, wherein the maximum number of detectable objects is a number that is set in advance.

6. The video signal processing device according to claim 2, wherein the slope gain joining portion sets the smallest slope gain from among the slope gains calculated for the plurality of objects as the correction gain; and
    wherein the signal level correction portion corrects the input video signal by a factor of (1−(the correction gain)).

7. The video signal processing device according to claim 2, wherein each of the slope gain creation portions includes (i) a distance calculation portion operable to calculate, for each pixel making up the unit image, a distance between the corresponding object and the pixel, and (ii) a gain calculation portion operable to calculate the slope gain for the corresponding object in accordance with the distances calculated by the distance calculate portion.

8. The video signal processing device according to claim 7, wherein each of the gain calculation portions calculates the slope gain for the corresponding object such that the slope gain increases the greater a distance from a substantial center point of the corresponding object.

9. The video signal processing device according to claim 8, wherein each of the gain calculation portions calculates the slope gain for the corresponding object using a Gaussian function.

10. The video signal processing device according to claim 2, wherein each of the slope gain creation portions further includes an object distance calculation portion operable to calculate a total object distance that is a sum of distances between the corresponding object and objects, from among the plurality of objects detected by the multiple object detection, other than the corresponding object; and
    wherein the each of the slope gain creation portions calculates the slope gain for the corresponding object based on the total object distance.

11. The video signal processing device according to claim 2, wherein the each of the slope gain creation portions calculates the slope gain for the corresponding object in accordance with a property of the corresponding object.

12. The video signal processing device according to claim 11, wherein the property of the corresponding object is at least one of a number of objects detected by the multiple object detection portion, the size of the corresponding object, and a distance from the center of the display screen to a substantially center point of the corresponding object.

13. The video signal processing device according to claim 2, further comprising:
    a default slope gain creation portion including (i) a central distance calculation portion that is operable to calculate, for each pixel making up the unit image, a distance between the pixel and the center of the display screen, and (ii) a gain calculation portion that is operable to calculate the slope gain in accordance with the distances calculated by the central distance calculation portion,
    wherein the slope gain joining portion, (i) in a case where no objects are detected by the multiple object detection portion, sets the slope gain calculated by the default slope gain creation portion as the correction gain, and (ii) in a case where an object has been detected by the multiple object detection portion, joins the slope gain that has been calculated by the default slope gain creation portion and the slope gain that has been calculated for the object by the corresponding slope gain creation portion to create the single correction gain.

14. The video signal processing device according to claim 13, wherein the slope gain joining portion sets the slope gain that has been calculated by the default slope gain creation portion as the correction gain in a case where a number of objects detected by the multiple object detection portion is equal to or greater than a fixed value.

15. The video signal processing device according to claim 1, further comprising:
    a characteristic amount extraction portion that is operable to extract a characteristic amount from the unit image;
    wherein the correction gain calculation portion calculates the slope gain in accordance with the characteristic amount.

16. A video signal display device, comprising the video signal processing device according to claim 1, and a display device operable to display a video signal output from the video signal processing device.

17. The video signal processing device according to claim 16,
wherein the display device is a self-emitting type display device that includes a power limit portion operable to limit power consumed by the display device when an average picture level of the video signal is equal to or greater than a predetermined value.

18. A video signal processing method of creating a display video signal to be displayed on a light-adjustable display device, the video processing method comprising:
detecting a plurality of objects that are included in a unit image that is formed by an input video signal;
calculating a correction gain when the unit image is displayed on the light-adjustable display device; and
correcting the input video signal in accordance with the correction gain and outputting the result to the light-adjustable display device as the display video signal,
wherein the correction gain is calculated so that an emission amount at a first point on a display screen is lower than an emission amount at a second point on the display screen, and
wherein (i) the first point on the display screen is in a region between two points substantially located at the center of two objects, respectively, from among the plurality of objects, and (ii) the second point on the display screen is one of the two points substantially located at the center of the two objects.

19. A non-transitory computer-readable storage medium having stored thereon a video signal processing program for use in a video signal processing device, wherein, when executed, the video processing program causes the video signal processing device to perform a method comprising:
detecting a plurality of objects that are included in a unit image that is formed by an input video signal;
calculating a correction gain when the unit image is displayed on the light-adjustable display device; and
correcting the input video signal in accordance with the correction gain and outputting the result to the light-adjustable display device as the display video signal,
wherein the correction gain is calculated so that an emission amount at a first point on a display screen is lower than an emission amount at a second point on the display screen, and
wherein (i) the first point on the display screen is in a region between two points substantially located at the center of two objects, respectively, from among the plurality of objects, and (ii) the second point on the display screen is one of the two points substantially located at the center of the two objects.

20. An integrated circuit for creating a display video signal to be displayed on a light-adjustable display device, comprising:
a multiple object detection portion operable to detect a plurality of objects that are included in a unit image that is formed by an input video signal;
a correction gain calculation portion operable to calculate a correction gain when the unit image is displayed on the light-adjustable display device; and
a signal level correction portion operable to (i) correct the input video signal in accordance with the correction gain and (ii) output the result to the display device as the display video signal,
wherein the correction gain is calculated so that an emission amount at a first point on a display screen is lower than an emission amount at a second point on the display screen, and
wherein (i) the first point on the display screen is in a region between two points substantially located at the center of two objects, respectively, from among the plurality of objects, and (ii) the second point on the display screen is one of the two points substantially located at the center of the two objects.

21. The video signal processing device according to claim 1,
wherein the plurality of objects detected by the multiple object detection portion includes N objects detected by the multiple object description portion, where N is a natural number that is larger than 2, and
wherein the correction gain is calculated with respect to the N objects detected by the multiple object detection portion so that the correction gain becomes larger with increasing distance from a point that is substantially centered between any two of the N objects.

22. The video signal processing device according to claim 21,
wherein the correction gain calculation portion includes (i) a number of slope gain creation portions equal to a maximum number of detectable objects, each of the slope gain portions being operable to calculate a slope gain for a corresponding object from among the N objects detected by the multiple object detection portion, and (ii) a slope gain joining portion operable to join the slope gain calculated for each of the N objects detected by the multiple object detection portion to create a single correction gain, and
wherein the single correction gain is a combined slope gain G calculated by any one of (1), (2), (3), or (4) below in which the slope gains calculated for the N objects are denoted as gainp1, gainp2, , gainpN, respectively,
(1) $G=1-\mathrm{Min}(gainp1, gainp2, \ldots, gainpN)$, where Min is a function to take a minimum value among gainp1 to gainpN,
(2) $G=1-(1-gainp1) \times (1-gainp2) \times \ldots (1-gainpN)$,
(3) $G=1- \{(1-gainp1) \times ((1-gainp2) \times \ldots (1-gainpN)\}^{(1/N)}$, and
(4) $G=1- \{(1-gainp1) \times (1-gainp2) \times \ldots (1-gainpN)\}/N$.

* * * * *